United States Patent
Nigam et al.

(10) Patent No.: US 8,041,669 B2
(45) Date of Patent: *Oct. 18, 2011

(54) TOPICAL SENTIMENTS IN ELECTRONICALLY STORED COMMUNICATIONS

(75) Inventors: Kamal P. Nigam, Pittsburgh, PA (US); Matthew F. Hurst, Pittsburgh, PA (US)

(73) Assignee: Buzzmetrics, Ltd., Herzliya Pituach (IL)

( * ) Notice: Subject to any disclaimer, the term of this patent is extended or adjusted under 35 U.S.C. 154(b) by 0 days.

This patent is subject to a terminal disclaimer.

(21) Appl. No.: 12/969,356

(22) Filed: Dec. 15, 2010

(65) Prior Publication Data

US 2011/0093417 A1   Apr. 21, 2011

Related U.S. Application Data

(63) Continuation of application No. 12/395,239, filed on Feb. 27, 2009, now Pat. No. 7,877,345, which is a continuation of application No. 11/245,542, filed on Sep. 30, 2005, now Pat. No. 7,523,085.

(60) Provisional application No. 60/614,941, filed on Sep. 30, 2004.

(51) Int. Cl.
*G06F 17/00* (2006.01)
*G06N 7/00* (2006.01)
*G06N 7/08* (2006.01)

(52) U.S. Cl. ........................................................ 706/55

(58) Field of Classification Search ..................... 706/55
See application file for complete search history.

(56) References Cited

U.S. PATENT DOCUMENTS

| | | | |
|---|---|---|---|
| 3,950,618 A | 4/1976 | Bloisi | |
| 5,041,972 A | 8/1991 | Frost | |
| 5,077,785 A | 12/1991 | Monson | |
| 5,124,911 A | 6/1992 | Sack | |
| 5,301,109 A | 4/1994 | Landauer et al. | |
| 5,317,507 A | 5/1994 | Gallant | |
| 5,321,833 A | 6/1994 | Chang et al. | |
| 5,371,673 A | 12/1994 | Fan | |
| 5,495,412 A | 2/1996 | Thiessen | |
| 5,519,608 A | 5/1996 | Kupiec | |
| 5,537,618 A | 7/1996 | Boulton et al. | |
| 5,659,732 A | 8/1997 | Kirsch | |

(Continued)

FOREIGN PATENT DOCUMENTS

WO   0017824   3/2000

OTHER PUBLICATIONS

Adamic et al., The political blogosphere and the 2004 U.S. election: Divided they blog, Proceedings WWW-2005 2nd Annual Workshop on the Weblogging Ecosystem, 2005, Chiba, Japan.

(Continued)

*Primary Examiner* — Michael B Holmes

(74) *Attorney, Agent, or Firm* — Hanley, Flight & Zimmerman, LLC

(57) ABSTRACT

The present application presents methods for performing topical sentiment analysis on electronically stored communications employing fusion of polarity and topicality. The present application also provides methods for utilizing shallow NLP techniques to determine the polarity of an expression. The present application also provides a method for tuning a domain-specific polarity lexicon for use in the polarity determination. The present application also provides methods for computing a numeric metric of the aggregate opinion about some topic expressed in a set of expressions.

18 Claims, 7 Drawing Sheets

U.S. PATENT DOCUMENTS

| | | |
|---|---|---|
| 5,659,742 A | 8/1997 | Beattie et al. |
| 5,668,953 A | 9/1997 | Sloo |
| 5,671,333 A | 9/1997 | Catlett et al. |
| 5,675,710 A | 10/1997 | Lewis |
| 5,696,962 A | 12/1997 | Kupiec |
| 5,794,412 A | 8/1998 | Ronconi |
| 5,819,285 A | 10/1998 | Damico et al. |
| 5,822,744 A | 10/1998 | Kesel |
| 5,836,771 A | 11/1998 | Ho et al. |
| 5,845,278 A | 12/1998 | Kirsch et al. |
| 5,857,179 A | 1/1999 | Vaithyanathan et al. |
| 5,884,302 A | 3/1999 | Ho |
| 5,895,450 A | 4/1999 | Sloo |
| 5,911,043 A | 6/1999 | Duffy et al. |
| 5,920,854 A | 7/1999 | Kirsch et al. |
| 5,924,094 A | 7/1999 | Sutter |
| 5,950,172 A | 9/1999 | Klingman |
| 5,950,189 A | 9/1999 | Cohen et al. |
| 5,953,718 A | 9/1999 | Wical |
| 5,974,412 A | 10/1999 | Halehurst et al. |
| 5,983,214 A | 11/1999 | Lang et al. |
| 5,983,216 A | 11/1999 | Kirsch et al. |
| 6,006,221 A | 12/1999 | Liddy et al. |
| 6,012,053 A | 1/2000 | Pant et al. |
| 6,021,409 A | 2/2000 | Burrows |
| 6,026,387 A | 2/2000 | Kesel |
| 6,026,388 A | 2/2000 | Liddy et al. |
| 6,029,161 A | 2/2000 | Lang et al. |
| 6,029,195 A | 2/2000 | Herz |
| 6,032,145 A | 2/2000 | Beall et al. |
| 6,035,294 A | 3/2000 | Fish |
| 6,038,610 A | 3/2000 | Belfiore et al. |
| 6,064,980 A | 5/2000 | Jacobi et al. |
| 6,067,539 A | 5/2000 | Cohen |
| 6,078,892 A | 6/2000 | Anderson et al. |
| 6,094,657 A | 7/2000 | Hailpern et al. |
| 6,098,066 A | 8/2000 | Snow et al. |
| 6,112,203 A | 8/2000 | Bharat et al. |
| 6,119,933 A | 9/2000 | Wong |
| 6,138,113 A | 10/2000 | Dean et al. |
| 6,138,128 A | 10/2000 | Perkowitz et al. |
| 6,169,986 B1 | 1/2001 | Bowman et al. |
| 6,185,558 B1 | 2/2001 | Bowman et al. |
| 6,192,360 B1 | 2/2001 | Dumais et al. |
| 6,202,068 B1 | 3/2001 | Kraay et al. |
| 6,233,575 B1 | 5/2001 | Agrawal |
| 6,236,977 B1 | 5/2001 | Verba et al. |
| 6,236,987 B1 | 5/2001 | Horowitz et al. |
| 6,236,991 B1 | 5/2001 | Frauenhofer et al. |
| 6,260,041 B1 | 7/2001 | Gonzalez |
| 6,266,664 B1 | 7/2001 | Russell-Falla |
| 6,269,362 B1 | 7/2001 | Broder et al. |
| 6,278,990 B1 | 8/2001 | Horowitz |
| 6,289,342 B1 | 9/2001 | Lawrence et al. |
| 6,304,864 B1 | 10/2001 | Liddy et al. |
| 6,308,176 B1 | 10/2001 | Bagshaw |
| 6,314,420 B1 | 11/2001 | Lang et al. |
| 6,334,131 B2 | 12/2001 | Chakrabarti et al. |
| 6,360,215 B1 | 3/2002 | Judd et al. |
| 6,362,837 B1 | 3/2002 | Ginn |
| 6,366,908 B1 | 4/2002 | Chong et al. |
| 6,377,946 B1 | 4/2002 | Okamoto et al. |
| 6,385,586 B1 | 5/2002 | Dietz |
| 6,393,460 B1 | 5/2002 | Gruen et al. |
| 6,401,118 B1 | 6/2002 | Thomas |
| 6,411,936 B1 | 6/2002 | Sanders |
| 6,418,433 B1 | 7/2002 | Chakrabarti et al. |
| 6,421,675 B1 | 7/2002 | Ryan et al. |
| 6,434,549 B1 | 8/2002 | Linetsky et al. |
| 6,493,703 B1 | 12/2002 | Knight et al. |
| 6,507,866 B1 | 1/2003 | Barchi |
| 6,513,032 B1 | 1/2003 | Sutter |
| 6,519,631 B1 | 2/2003 | Rosenschein et al. |
| 6,526,440 B1 | 2/2003 | Bharat |
| 6,539,375 B2 | 3/2003 | Kawasaki |
| 6,546,390 B1 | 4/2003 | Pollack et al. |
| 6,571,234 B1 | 5/2003 | Knight et al. |
| 6,571,238 B1 | 5/2003 | Pollack et al. |
| 6,574,614 B1 | 6/2003 | Kesel |
| 6,584,470 B2 | 6/2003 | Veale |
| 6,606,644 B1 | 8/2003 | Ford et al. |
| 6,622,140 B1 | 9/2003 | Kantrowitz |
| 6,640,218 B1 | 10/2003 | Golding et al. |
| 6,651,086 B1 | 11/2003 | Manber et al. |
| 6,654,813 B1 | 11/2003 | Black et al. |
| 6,658,389 B1 | 12/2003 | Alpdemir |
| 6,708,215 B1 | 3/2004 | Hingorani et al. |
| 6,721,734 B1 | 4/2004 | Subasic et al. |
| 6,751,606 B1 | 6/2004 | Fries et al. |
| 6,751,683 B1 | 6/2004 | Johnson et al. |
| 6,757,646 B2 | 6/2004 | Marchisio |
| 6,772,141 B1 | 8/2004 | Pratt et al. |
| 6,775,664 B2 | 8/2004 | Lang et al. |
| 6,778,975 B1 | 8/2004 | Anick et al. |
| 6,782,393 B1 | 8/2004 | Balabanovic et al. |
| 6,795,826 B2 | 9/2004 | Flinn et al. |
| 6,807,566 B1 | 10/2004 | Bates et al. |
| 6,928,526 B1 | 8/2005 | Zhu et al. |
| 6,978,292 B1 | 12/2005 | Murakami et al. |
| 6,983,320 B1 | 1/2006 | Thomas |
| 6,999,914 B1 | 2/2006 | Boerner et al. |
| 7,188,078 B2 | 3/2007 | Arnett et al. |
| 7,188,079 B2 | 3/2007 | Arnett et al. |
| 7,197,470 B1 | 3/2007 | Arnett et al. |
| 7,523,085 B2 * | 4/2009 | Nigam et al. ............ 706/55 |
| 7,877,345 B2 * | 1/2011 | Nigam et al. ............ 706/55 |
| 2001/0042087 A1 | 11/2001 | Kephart et al. |
| 2002/0032772 A1 | 3/2002 | Olstad et al. |
| 2002/0059258 A1 | 5/2002 | Kirkpatrick |
| 2002/0087515 A1 | 7/2002 | Swannack |
| 2002/0123988 A1 | 9/2002 | Dean et al. |
| 2002/0133481 A1 | 9/2002 | Smith et al. |
| 2002/0159642 A1 | 10/2002 | Whitney |
| 2003/0070338 A1 | 4/2003 | Roshkoff |
| 2004/0024752 A1 | 2/2004 | Manber et al. |
| 2004/0059708 A1 | 3/2004 | Dean et al. |
| 2004/0059729 A1 | 3/2004 | Krupin et al. |
| 2004/0078432 A1 | 4/2004 | Manber et al. |
| 2004/0111412 A1 | 6/2004 | Broder |
| 2004/0122811 A1 | 6/2004 | Page |
| 2004/0199498 A1 | 10/2004 | Kapur et al. |
| 2004/0205482 A1 | 10/2004 | Basu et al. |
| 2004/0210561 A1 | 10/2004 | Shen |
| 2005/0049908 A2 | 3/2005 | Hawks |
| 2005/0114161 A1 | 5/2005 | Garg |
| 2005/0125216 A1 | 6/2005 | Chitrapura et al. |
| 2006/0004691 A1 | 1/2006 | Sifry |
| 2006/0041605 A1 | 2/2006 | King et al. |
| 2006/0069589 A1 | 3/2006 | Nigam et al. |
| 2006/0173819 A1 | 8/2006 | Watson |
| 2006/0173837 A1 | 8/2006 | Berstis et al. |
| 2006/0206505 A1 | 9/2006 | Hyder et al. |
| 2007/0027840 A1 | 2/2007 | Cowling et al. |

OTHER PUBLICATIONS

Adar et al., Implicit structure and dynamics of blogspace, Proceedings WWW-2004 Workshop on the Weblogging Ecosystem, 2004, New York, NY.

Aliod, Diego Molla, et al., "A Real World Implementation of Answer Extraction", Department of Computer Science, University of Zurich, Winterthurerstr. 190, CH-8057 Zurich, Switzerland, pp. 1-6.

Bishop, Mike, "ARROW Question/Answering Systems", Language Computer Corporation, 1999, pp. 1-3.

Archived version of www.bizrate.com, Jan. 1999.

Bournellis, Cynthia, "Tracking the hits on Web Sites", Communications International. London: Sep. 1995. vol. 22, Issue 9, 3 pages.

Cohen, William W., "Data Integration using similarity joins and a word-based information representation language," in ACM Transactions on Information Systems, Jul. 2000, pp. 288-321, vol. 18, No. 3.

Cohn et al., "Active Learning with Statistical Models", Journal of Artificial Intelligence Research 4 (1996), 129-145, AI Access Foundation and Morgan Kaufmann Publishers, USA.

Delahaye Group to Offer Net Bench: High Level Web-Site Qualitative Analysis and Reporting; Netbench Builds on Systems provided by I/PRO and Internet Media Services, 1995 business Wire, Inc., May 31, 1995, 3 pages.

www.dialogic.com as archived on May 12, 2000.
Dillon et al., Marketing research in a Marketing Environment, 1987, Times Mirror/Mosby College, USA, pp. 98, 286, 288.
eWatch's archived web site retrieved from [URL: http://web.archive.org/web/19980522190526/wwww.ewatch.com] on Sep. 8, 2004, archived May 22, 1998.
Farber, Dave. "IP: eWatch and Cybersleuth," Jun. 29, 2000, retrieved from [URL: http://www.interesting-people.org/archives/interesting-people/200006/msg00090.html].
Freund et al., "Selective Sampling Using the Query by Committee Algorithm", Machine Learning 28 (1997), 133-168, Kluwer Academic Publishers, The Netherlands.
Glance et al., Analyzing online disussion for marketing intelligence, Proceedings WWW-2005 2nd Annual Workshop on the Weblogging Ecosystem, 2005, Chiba, Japan.
Glance et al., Deriving marketing intelligence from online discussion, 11th ACM SIGKDD International Conf. on Knowledge Discovery and Data Mining, Aug. 21-24, 2005, Chicago, IL.
Harabagiu, Sanda M., "An Intelligent System for Question Answering", University of Southern California; Modlovan, Dan, Southern Methodist University, pp. 1-5.
Harabagiu, Sanda M. et al., "Experiments with Open-Domain Textual Question Asnwering", Department of Computer Science and Engineering at Southern Methodist Universtity, pp. 1-7.
Harabagiu, Sanda M. et al., "Mining Textual Answers with Knowledge-Based Indicators", Department of Computer Science and Engineering at Southern Methodist University, pp. 1-5.
Kahn et al., Categorizing Web Documents using Competitive Learning; An ingrediant of a Personal Adaptive Agent, IEEE; c 1997.
Katz, Boris, "From Sentence Processing to Information Access on the World Wide Web: START Information Server", MIT Artificial Intelligence Laboratory, Feb. 27, 1997.
Kleppner, Advertising Procedure, 6th edition, 1977, Prentice-Hall, Inc., Englewood Cliffs, NJ, p. 492.
Kotler, Marketing Management, 1997, PrenticeHall International Inc., Upper Saddle River, NJ, pp. 617-619, 656-658, 665-667.
Lenz, Mario, et al., "Question answering with Textual CBR", Department of Computer Science, Humboldt University Berlin, D-10099 Berlin, pp. 1-12.
Marlow, Audience, structure and authority in the weblog community, International Communication Association Conference, MIT Media Laboratory, 2004, New Orleans, LA.
McCallum et al., "Text Classification by Bootstrapping with the Keywords, EM and Shrinkage", Just Research and Carnegie Mellon U., circa 1999, Pittsburgh, PA, USA.
Moldovan, Dan et al., "LASSO: A Tool for Surfing the Answer Net", Department of Computer Science and Engineering at Southern Methodist University, pp. 1-9.
Nakashima et al., Information Filtering for the Newspaper, IEE; c 1997.
Nanno et al., Automatic collection and monitoring of Japanese Weblogs, Proceedings WWW-2004 Workshop on the weblogging Ecosystem, 2004, New York, NY.
NetCurrent's web site, retrieved from [URL: http://web.archive.org/web/20000622024845/www.netcurrents.com] on Jan. 17, 2005, archived on Jun. 22, 2000 and Sep. 18, 2000.
Reinartz, Customer Lifetime Value Analysis: An Integrated Empirical Framework for Measurement and Explanation, dissertation: Apr. 1999, pp. 57-118.
Thomas, International Marketing, 1971, International Textbook Company, Scranton, PA, p. 148.
Trigaux, Robert. "Cyberwar Erupts Over Free Speech Across Florida, Nation." Knight-Ridder Tribune Business News, May 29, 2000.
Tull et al., Marketing Research Measurement and Method, 1984, MacMillan Publishing Company, New York, NY, pp. 102, 103, 114, 115, 200 201 and 256.

Voorhees, Ellen M., "The TREC-8 Question Answering Track Report", National Institute of Standards and Technology, pp. 1-6.
Word of Mouth Research Case Study, "The Trans Fat Issue, Analysis of online consumer conversation to understand hwo the Oreo lawsuit impacted word-of-mouth on trans fats.", Aug. 16, 2004, 35 pages.
www.zagat.com archived on Apr. 29, 1999.
p. 34 of archived version of www.zagat.com, Feb. 1999.
United States Patent and Trademark, "Office Action" issued in connection with U.S. Appl. No. 11/710,742, mailed Jan. 5, 2010 (9 pages).
United States Patent and Trademark, "Office Action" issued in connection with U.S. Appl. No. 11/710,743, mailed Jan. 8, 2010 (23 pages).
United States Patent and Trademark, "Office Action" issued in connection with U.S. Appl. No. 11/245,542, mailed Oct. 9, 2007 (12 pages).
United States Patent and Trademark, "Office Action" issued in connection with U.S. Appl. No. 11/245,542, mailed Jun. 12, 2008 (9 pages).
United States Patent and Trademark, "Notice of Allowance" issued in connection with U.S. Appl. No. 11/245,542, mailed Aug. 21, 2008 (5 pages).
United States Patent and Trademark, "Notice of Allowance" issued in connection with U.S. Appl. No. 11/245,542, mailed Oct. 8, 2008 (8 pages).
United States Patent and Trademark, "Notice of Allowance" issued in connection with U.S. Appl. No. 11/245,542, mailed Dec. 16, 2008 (5 pages).
International Searching Authority, "International Search Report and Written Opinion," issued in connection with international application No. PCT/US05/35321, mailed May 8, 2007 (7 pages).
McLachlan et al., "The EM Algorithm and Extensions," Copyright 1997, pp. 1-274, John Wiley & Sons, Inc., New York, USA (301 pages).
Grefenstette et al., "Validating the Coverage of Lexical Resources for Affect Analysis and Automatically Classifying New Words along Semantic Axes," Chapter X, Mar. 2004 (16 pages).
Wiebe et al., "Identifying Collocations for Recognizing Opinions," in proceedings of ACL/EACL '01 workshop on collocation, Toulouse, France, Jul. 2001 (9 pages).
Dagan et al, "Mistake-Driven Learning in Text Categorization," in EMNLP '97, $2^{nd}$ Conference on Empirical Methods in Natural Language Processing, 1997 (9 pages).
Yang, "An Evaluation of Statistical Approaches to Text Categorization," Information Retrieval 1 (1/2) Apr. 10, 1999 (12 pages).
Joachims, "Text Categorization with Support Vector Machines: Learning with Many Relevant Features," in Machine Learning: ECML-98, Tenth European Conference on Machine Learning, 1998 (7 pages).
Blum, "Empirical Support for Winnow and Weighted-Majority Algorithms: Results on a Calendar Scheduling Domain," in Machine Learning, vol. 26, pp. 5-23, 1997 (19 pages).
Littlestone, "Learning Quickly When Irrelevant Attributes Abound: A New Linear-threshold Algorithm," in Machine Learning 2, pages 285-318, 1988 (34 pages).
Pang et al., "Thumbs up? Sentiment Classification using Machine Learning Techniques," in Proceedings of EMNLP 2002 (8 pages).
United States Patent and Trademark, "Office Action" issued in connection with U.S. Appl. No. 12/395,239, mailed Aug. 17, 2010 (7 pages).
United States Patent and Trademark, "Notice of Allowance" issued in connection with U.S. Appl. No. 12/395,239, mailed Nov. 8, 2010 (9 pages).

* cited by examiner

FIG. 6

TOPICAL SENTIMENTS IN ELECTRONICALLY STORED COMMUNICATIONS

CROSS REFERENCE TO RELATED APPLICATIONS

The present application claims the benefit of U.S. Provisional Patent Application Ser. No. 60/614,941, filed Sep. 30, 2004, U.S. patent application Ser. No. 11/245,542, filed Sep. 30, 2005, and U.S. patent application Ser. No. 12/395,239, filed Feb. 27, 2009, each of which is incorporated by reference in its entirety.

BACKGROUND

One of the most important and most difficult tasks in marketing is to ascertain, as accurately as possible, how consumers view various products. A simple example illustrates the problem to be solved. As the new marketing manager for BrightScreen, a supplier of LCD screens for personal digital assistants (PDAs), you would like to understand what positive and negative impressions the public holds about your product. Your predecessor left you 300,000 customer service emails sent to BrightScreen last year that address not only screens for PDAs, but the entire BrightScreen product line. Instead of trying to manually sift through these emails to understand the public sentiment, can text analysis techniques help you quickly determine what aspects of your product line are viewed favorably or unfavorably?

One way to address BrightScreen's business need would be a text mining toolkit that automatically identifies just those email fragments that are topical to LCD screens and also express positive or negative sentiment. These fragments will contain the most salient representation of the consumers' likes and dislikes specifically with regard to the product at hand. The goal of the present invention is to reliably extract polar sentences about a specific topic from a corpus of data containing both relevant and irrelevant text.

Recent advances in the fields of text mining, information extraction, and information retrieval have been motivated by a similar goal: to exploit the hidden value locked in huge volumes of unstructured data. Much of this work has focused on categorizing documents into a predefined topic hierarchy, finding named entities (entity extraction), clustering similar documents, and inferring relationships between extracted entities and metadata.

An emerging field of research with much perceived benefit, particularly to certain corporate functions such as brand management and marketing, is that of sentiment or polarity detection. For example, sentences such as I hate its resolution or The BrightScreen LCD is excellent indicate authorial opinions about the BrightScreen LCD. Sentences such as The BrightScreen LCD has a resolution of 320×200 indicates factual objectivity. To effectively evaluate the public's impression of a product, it is much more efficient to focus on the small minority of sentences containing subjective language.

Recently, several researchers have addressed techniques for analyzing a document and discovering the presence or location of sentiment or polarity within the document. J. Wiebe, T. Wilson, and M. Bell, "Identifying collocations for recognizing opinions," in *Proceedings of ACLIEACL '01 Workshop on Collocation*, (Toulouse, France), July 2001, discovers subjective language by doing a fine-grained NLP-based textual analysis. B. Pang, L. Lee, and S. Vaithyanathan, "Thumbs up? sentiment classification using machine learning techniques," in *Proceedings of EMNLP 2002*, 2002 use a machine learning classification-based approach to determine if a movie review as a whole is generally positive or negative about the movie.

This prior art makes significant advances into this novel area. However, they do not consider the relationship between polar language and topicality. In taking a whole-document approach, Pang, et al. sidesteps any issues of topicality by assuming that each document addresses a single topic (a movie), and that the preponderance of the expressed sentiment is about the topic. In the domain of movie reviews this may be a good assumption (though it is not tested), but this assumption docs not generalize to less constrained domains (It is noted that the data used in that paper contained a number of reviews about more than one movie. In addition, the domain of movie reviews is one of the more challenging for sentiment detection as the topic matter is often of an emotional character; e.g., there are bad characters that make a movie enjoyable.) Weibe et al.'s approach does a good job of capturing the local context of a single expression, but with such a small context, the subject of the polar expression is typically captured by just the several base noun words, which are often too vague to identify the topic in question.

SUMMARY

In summary, in an industrial application setting, the value of polarity detection is very much increased when married with an ability to determine the topic of a document or part of a document. In this application, we outline exemplary methods for recognizing polar expressions and for determining the topic of a document segment.

The present invention, therefore, provides a lightweight but robust approach to combining topic and polarity, thus enabling text mining systems select content based on a certain opinion about a certain topic.

More specifically, a first aspect of the present invention can be characterized as providing a computer implemented method (in which a computer can be any type of computer or computer system, network or combination thereof programmed and configured to perform the steps described herein) for obtaining topical sentiments from an electronically stored communication (which can be, for example and without limitation, an electronic document, message, email, blog post, and the like—and it is not important to the invention exactly where or how the communication is electronically stored and/or accessed) that includes the steps of (in no specific order): (a) determining a topic of a segment of the communication; and (b) locating a polar expression in the communication. In a more detailed embodiment, the method also includes the step of (c) determining a polarity of the polar expression, where the polarity may be positive, negative, mixed and/or neutral, for example. It is also within the scope of the invention that the method include the step of (d) associating the determined polarity with the determined topic.

The steps (b) locating a polar expression in the electronically stored communication and (c) determining the polarity of the polar expression may include the steps of: (1) establishing a domain-general polarity lexicon of sentimental/polar phrases (i.e., words and phrases) (2) establishing a topical domain being explored; (3) generating a polarity lexicon of sentimental phrases associated with the topical domain; (4) utilizing the polarity lexicon against phrases found in the polar expression; and (5) assigning at least one polar phrase in the polar expression a polarity associated with a matching phrase in the polarity lexicon. The step (c) of determining the polarity of the polar expression may also include the step of assigning at least one polar phrase in the polar expression a polarity. In a more detailed embodiment the method may further include the step of (e) analyzing the polar expression with syntactic and/or semantic rules to determine a topic of the polar expression and to link the determined topic to the polarity of the polar phrase.

It is further within the scope of the invention that the step (a) of determining a topic of the segment of the communication containing or associated with the polar expression includes the step of processing the segment with a communication (i.e., text) classifier. Such communication classifier may utilize an algorithm, such as a Winnow algorithm, a Support Vector Machine algorithm, a k-Nearest Neighbor algorithm, other machine learning algorithms, or a hand-built rules-based classifier.

It is also within the scope of the invention that the step (a) of determining a topic of the segment of the communication and the step (c) of determining the polarity of the polar expression are independent tasks.

The segments of the communication discussed above maybe an entire communication or a portion of the communication, such as a sentence for example. Further the segment discussed above may be the polar expression.

A second aspect of the present invention can be characterized as providing a computer implemented method for obtaining topical sentiments from a body of communications (text, electronic, etc.) comprising the steps of: (a) isolating a subset of the communications relevant to a particular topic; and (b) locating a polar expression in at least one of the subset of communications. The method may also include the steps of (c) determining the polarity of the polar expression and (d) associating the polarity with the particular topic.

A third aspect of the present invention can be characterized as providing a computer implemented method for obtaining topical sentiments from a body of communications (text, electronic, etc.) comprising the steps of: (a) isolating a first subset of the communications relevant to a particular topic; and (b) isolating a second subset of communications from the first subset of communications where the second subset of communications includes polar segments (i.e., negative or positive) located in the first subset of communications. The second subset can be broken into further subsets depending upon the particular polarity of the polar segments (i.e., there can be subsets for positive segments, negative segments, neutral segments and/or others). The method may also include the step of (c) associating the polar segments with the particular topic. The segments can be a sentence, a phrase, a paragraph or an entire communication for example.

A fourth aspect of the present invention can be characterized as providing a computer implemented method for obtaining topical sentiments from a plurality of electronically stored communications that includes the steps of: (a) determining with the assistance of a computer whether each communication in a plurality of communications is topical to a first predefined topic; (b) for each communication determined to be topical to the predefined topic, separating with the assistance of a computer the communication into one or more expressions (a word or a group of words that form a constituent of a sentence and are considered as a single unit); (c) for each expression, determining with the assistance of a computer if the expression is topical to a second predefined topic; and (d) for each expression that is determined to be topical to the second predefined topic, determining with the assistance of a computer a polarity of the expression. In a more detailed embodiment the polarity may be positive, negative, and/or neutral. In another detailed embodiment, the step of determining the polarity of the expression may include the steps of: establishing a topical domain being explored; generating a polarity lexicon of sentimental words and/or phrases associated with the topical domain; utilizing with the assistance of a computer the polarity lexicon against words and/or phrases found in the expression; and assigning at least one polar phrase in the expression a polarity associated with a matching word and/or phrase in the polarity lexicon.

In yet another detailed embodiment of the fourth aspect of the present invention the step of determining the polarity of the expression may further include the step of analyzing with the assistance of a computer the expression with syntactic and/or semantic rules. In yet another detailed embodiment, the step of determining with the assistance of a computer whether each communication in a plurality of communications is topical to a first predefined topic includes the step of processing each communication with a text classifier. This text classifier may utilize an algorithm such as a Winnow algorithm, a Support Vector Machine algorithm, a k-Nearest Neighbor algorithm or a rules-based classifier.

In yet another detailed embodiment of the fourth aspect of the present invention the method may further include the step of (e) calculating with the assistance of a computer an aggregate metric from the plurality of expressions which estimates the frequency of positive and/or negative polar expressions. This step may include the generation of statistically-valid confidence bounds on the aggregate metric. This step (e) may also include the steps of: for each of the plurality of expressions, estimating an opinion based upon the presence, absence or strength of polarity associated with the predefined topic; and aggregating the overall opinion for the plurality of expressions. The step of aggregating the overall opinion for the plurality of expressions may include a step of normalizing the ratio of empirical or estimated frequency of positive and negative polarity associated with the predefined topic. Alternatively, the step (e) of calculating an aggregate metric from the plurality of expressions may utilize Bayesian statistics to derive estimates for positive and negative frequencies of polar expressions.

In yet another detailed embodiment of the fourth aspect of the present invention, the first predefined topic is a general topic and the second predefined topic is a specific topic associated with the general topic. In a further detailed embodiment the general topic is a product or service and the specific topic is a feature of the product or service. Alternatively, the general topic is a commercial brand and the specific topic is a feature of the commercial brand. It is also within the scope of the invention that the first predefined topic and the second predefined topic are the same topic.

A fifth aspect of the present invention can be characterized as a computer implemented method for calculating, from a plurality of electronically stored expressions, an aggregate metric which estimates a frequency of positive and/or negative polar expressions contained in the expressions. The method includes the steps of: for each of a plurality of electronically stored expressions, determining with the assistance of a computer an opinion contained in the expressions based upon at least one of the presence, absence and strength of polarity associated with a predefined topic; and calculating an aggregate metric from the determined opinions of the plurality of expressions. In a detailed embodiment of this fifth aspect of the present invention the step of calculating an aggregate metric from the determined opinions of the plurality of expressions includes the generation of statistically-valid confidence bounds on the aggregate metric. Alternatively, or in addition, the step of calculating an aggregate metric from the determined opinions of the plurality of expressions includes a step of normalizing the ratio of empirical or estimated frequency of positive and negative polarity associated with the predefined topic. Alternatively, or in addition, the step of calculating an aggregate metric from the determined opinions of the plurality of expressions further includes utilizing Bayesian statistics to derive estimates for positive and negative frequencies of polar expressions. Alternatively, or in addition, at least a portion of the plurality of expressions are taken from larger electronically stored communications. Alternatively, or in addition, the step of determining an opinion contained in the expressions includes the steps of, for each expression: determining with the assistance of a computer that the expression is topical to the predefined topic; and determining with the assistance of a computer a polarity of the expression.

A sixth aspect of the present invention can be characterized as a computer implemented method for finding one or more polar expressions in an electronically stored communication, which includes the step of analyzing with the assistance of a computer the electronically stored communication for one or more polar expressions within the electronically stored communication. This analyzing step includes the steps of: providing a polarity lexicon of sentimental words and/or phrases associated with a topical domain; utilizing with the assistance of a computer the polarity lexicon against words and/or phrases found in the expression; and assigning with the assistance of a computer at least one word/phrase in the expression a polarity associated with a matching word/phrase in the polarity lexicon. In a more detailed embodiment of this sixth aspect of the present invention, the step of assigning with the assistance of a computer at least one word/phrase in the expression a polarity associated with a matching word/phrase in the polarity lexicon, includes the steps of: separating the expression into word/phrase chunks; tagging the separated word/phrase chunks with part-of-speech tags; applying the polarity lexicon against the word/phrase chunks to tag one or more of the word/phrase chunks with a polarity tag; and applying syntactic and semantic rules against the tagged word/phrase chunks to elevate the polarity of the word/phrase chunk to the entire expression. The step of applying syntactic and semantic rules against the word/phrase chunks to elevate the polarity of the word/phrase chunk to the entire expression includes the step of identifying a word/phrase chunk in the expression that toggles the polarity of the word/phrase chunk tagged with the polarity tag. Alternatively, the step of applying syntactic and semantic rules against the word/phrase chunks to elevate the polarity of the word/phrase chunk to the entire expression includes the step of performing with the assistance of a computer grammatical analysis on the expression.

A seventh aspect of the present invention can be characterized as a computer implemented method for tuning a polarity lexicon for use in classifying polar expressions, which includes the steps of: (a) providing a polarity lexicon; (b) with the assistance of a computer implemented graphical user interface providing a user with candidate words for addition, subtraction or exclusion to the polarity lexicon; and (c) adding, subtracting or excluding each candidate word from the polarity lexicon according to input received by the graphical user interface. In a more detailed embodiment, the step of (b) providing a user with candidates for addition, subtraction or exclusion to the polarity lexicon includes a step of scanning a plurality of electronic messages collected for the topical domain for words that have the potential to be added to the lexicon. The scanning step may include a pattern based method that locates adjectives and adverbs that have a substantial chance of being polar; or the scanning step may locate candidate words by filtering the communication for words that appear at least a predefined number of times; or the scanning step may include a pattern based method that locates adjectives and adverbs that have a substantial chance of being polar and locates candidate words by filtering the communication for words that appear at least a predefined number of times.

In yet another detailed embodiment of the seventh aspect of the present invention, the step of (b) providing with a graphical user interface a user with candidate words for addition, subtraction or exclusion to the polarity lexicon includes the step of presenting each candidate word to the user with the word's part of speech label and an example of that candidate word appearing in at least one electronic message collected for the topical domain.

An eighth aspect of the present invention can be characterized as a computer implemented method for obtaining topical sentiments from an electronically stored communication, which includes the steps of: determining with the assistance of a computer one or more topical expressions in the communication; locating with the assistance of a computer one or more polar expressions in the communication; and identifying an expression that is both a topical expression and a polar expression as containing a topical sentiment. In a more detailed embodiment, the steps of determining one or more topical expressions and locating one or more polar expressions are isolated steps performed on the same communication. In a further detailed embodiment, the step of determining one or more topical expressions includes a step of applying an automated text classifier on the communication and the step of locating one or more polar expressions includes the step of utilizing a domain-specific lexicon and shallow NLP techniques.

Upon reviewing the following detailed description and associated drawings, it will be appreciated by those of ordinary skill in the art, of course, that many other aspects of the invention exist, which may not be summarized above.

BRIEF DESCRIPTION OF THE DRAWINGS

FIG. 1 is a graphical user interface screen view from an exemplary computerized tool for implementing certain embodiments of the present invention, showing results of a text mining algorithm;

FIG. 3 is a graphical user interface screen view from an exemplary computerized tool for implementing certain embodiments of the present invention, showing how both the positive and negative expressions found in the communications may be displayed to the user;

FIG. 4 is a graphical user interface screen view from an exemplary computerized tool for implementing certain embodiments of the present invention, showing complete text of a message containing an expression selected from the interface of FIG. 3;

FIG. 6 is a graphical user interface screen view from an exemplary computerized tool for implementing certain embodiments of the present invention, showing how a user may use the system to tune a polarity lexicon.

DETAILED DESCRIPTION

1. Introduction

Figure 2:
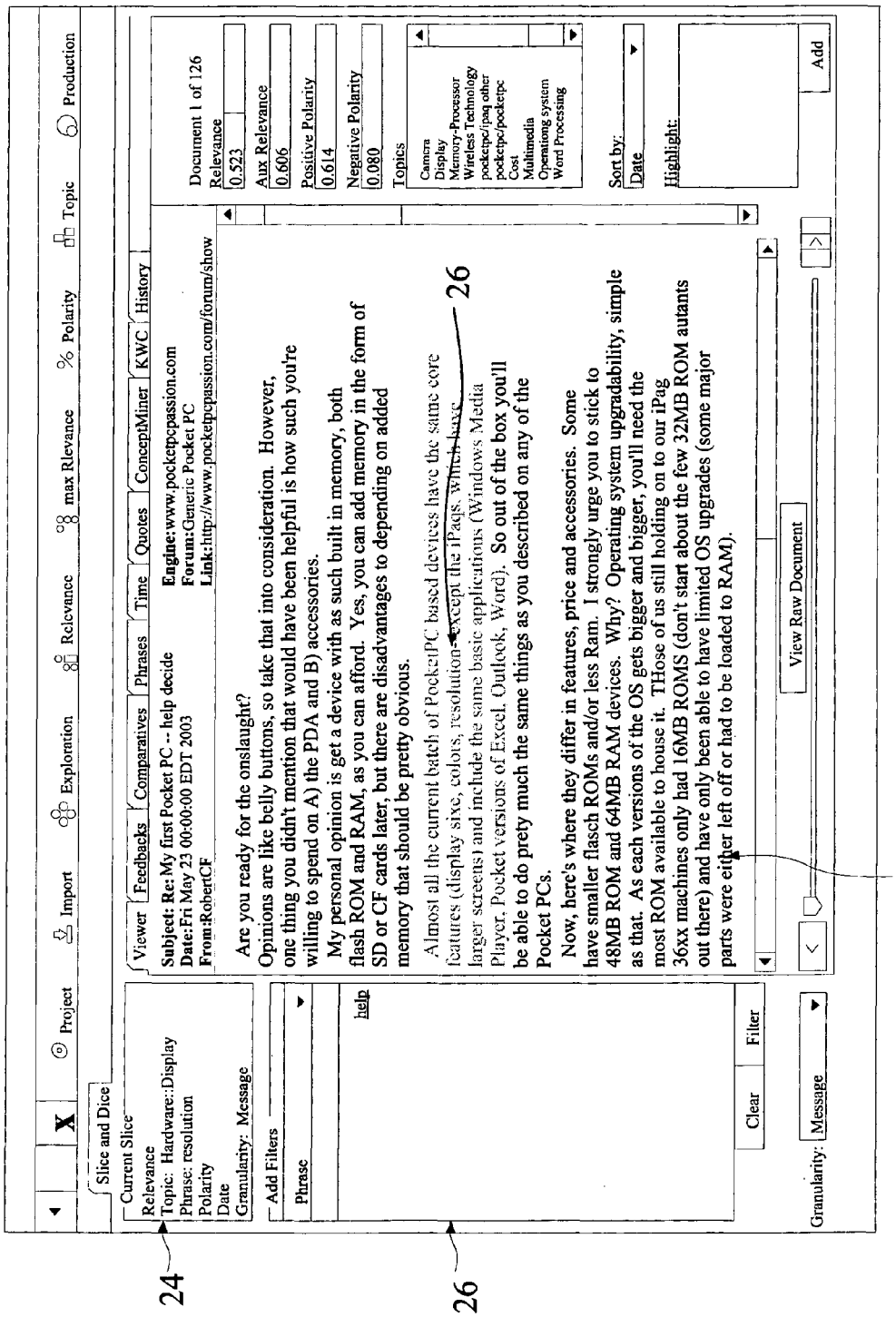
FIG. 2 is a graphical user interface screen view from an exemplary computerized tool for implementing certain embodiments of the present invention, showing how more specific sub-topics may be selected.

The present invention strikes out a middle ground between the Weibe et al. and Pang et al. approaches and presents a fusion of polarity and topicality. One approach to performing this task is to do a full NLP-style analysis of each sentence and understand at a deep level the semantics of the sentence, how it relates to the topic, and whether the sentiment of the expression is positive or negative. In the absence of comprehensive NLP techniques, we approximate the topicality judgment with either a statistical machine learning classifier or a hand-built rules-based classifier and the polarity judgment with shallow NLP techniques. An exemplary embodiment assumes that any sentence that is both polar and topical is polar about the topic in question. However, when these modules are run separately there are no guarantees that a sentence that is judged to be both topical and polar is expressing anything polar about the topic. For example the sentence It has a BrightScreen LCD screen and awesome battery life does not say anything positive about the screen. The present invention described herein demonstrates that the underlying combination assumption made by this system is sound, resulting in high-precision identification of these sentences.

The present application presents exemplary methods for performing topical sentiment analysis employing fusion of polarity and topicality. One approach to performing this task is to perform a full NLP-style analysis of each sentence and understand at a deep level the semantics of the sentence, how it relates to the topic, and whether the sentiment of the expression is positive or negative (or any other sentiment capable of being expressed in a message).

In the absence of comprehensive NLP techniques, alternate embodiments approximate the topicality judgment with a statistical machine learning classifier or a hand-built rules-based classifier and the polarity judgment with shallow NLP techniques. One embodiment of the system we describe assumes that any sentence that is both polar and topical is polar about the topic in question. However, when these modules are run separately there are no guarantees that a sentence that is judged to be both topical and polar is expressing anything polar about the topic. For example the sentence It has a BrightScreen LCD screen and awesome battery life does not say anything positive about the screen. Nevertheless, one embodiment described herein demonstrates that the underlying combination assumption made by this system is sound, resulting in high-precision identification of these sentences.

In summary, in an industrial application setting, the value of polarity detection is very much increased when married with an ability to determine the topic of a document or part of a document. In this application, we outline methods for recognizing polar expressions and for determining the topic of a document segment.

The present invention, therefore, provides a lightweight but robust approach to combining topic and polarity thus enabling content access systems to select content based on a certain opinion about a certain topic.

2. Polarity

2.1 Polarity Detection

Texts can be broadly categorized as subjective or objective. Those that are subjective often carry some indication of the author's opinion, or evaluation of a topic as well as some indication of the author's emotional state with respect to that topic. For example, the expression this is an excellent car indicates the author's evaluation of the car in question; I hate it! reflects the author's emotional state with respect to the topic. An additional type of expression informative in this context is that which indicates a desirable or undesirable condition. These expressions may be deemed objective. For example, It is broken may well be objective but is still describing an undesirable state.

An idealized view of polarity detection would be able to accept any document, or subsection thereof; and provide an indication of the polarity: the segment is either positive, negative, mixed or neutral. Additionally, in an alternative embodiment of the present invention, expressions can be analyzed and rated according to the strength of any sentiment that is capable of being expressed in words. Such sentiments need not be analyzed in opposite pairs (as in the case of positivity and negativity in the exemplary embodiment); a message can be analyzed for the expression of any individual qualitative sentiment, and the relative strength of that sentiment in the message can be expressed on a numerical scale (as is described herein with reference to the sentiments of positivity and negativity). Examples of such additional qualitative sentiments that can be expressed in a message and analyzed according to the present invention include, but are not limited to: anger, hate, fear, loyalty, happiness, respect, confidence, pride, hope, doubt, and disappointment.

However, this is only half of the story. Firstly, the classification of polar segments has a dependency on many other aspects of the text. For example, the adjective huge is negative in the context there was a huge stain on my trousers and positive in the context this washing machine can deal with huge loads. There is no guarantee that the information required to resolve such ambiguities will be present in the observable segment of the document.

Secondly, knowing that a piece of text is positive is only as useful as our ability to determine the topic of the segment. If a brand manager is told that this set of documents is positive and this set is negative, they cannot directly use this information without knowing, for example, which are positive about their product and which are positive about the competition.

An exemplary embodiment of the polar phrase extraction system according to the present invention was implemented with the following steps.

In the set up phase, a domain-general lexicon is developed. A lexicon is a list of words or phrases with their associated parts-of-speech, and a semantic orientation tag (e.g. positive or negative). For example, this may contain the words 'good' and 'bad' as positive and negative adjectives, respectively. Then, this domain-general lexicon is tuned to the domain being explored. For example, if we are looking at digital cameras, phrases like 'blurry' may be negative and 'crisp' may be positive. Care is taken not to add ambiguous terms where possible as we rely on assumptions about the distribution of the phrases that we can detect with high precision and its relationship to the distribution of all polar phrases. Note that our lexicon contains possibly 'incorrect' terms which reflect modem language usage as found in online messages. For example, there is an increasing lack of distinction between certain classes of adverbs and adjectives and so many adjectives are replicated as adverbs.

At run time, the input is tokenized. The tokenized input is then segmented into discrete chunks. The chunking phase includes the following steps. Part of speech tagging is carried out using a statistical tagger trained on Penn Treebank data. (We note that taggers trained on clean data, when applied to the noisy data found in our domain, are less accurate than with their native data.) Semantic tagging adds polar orientation information to each token (positive or negative) where appropriate using the prepared polarity lexicon. Simple linear POS tag patterns are then applied to form the chunks. The chunk types that are derived are basic groups (noun, adjective, adverb and verb) as well as determiner groups and an 'other' type.

The chunked input is then further processed to form higher-order groupings of a limited set of syntactic patterns. These patterns are designed to cover expressions that associate polarity with some topic, and those expressions that toggle the logical orientation of polar phrases (I have never liked it.). This last step conflates simple syntactic rules with semantic rules for propagating the polarity information according to any logical toggles that may occur.

If the text This car is really great were to be processed, firstly the tokenization step would result in the sequence {this, car, is, really, great}. Part of speech tagging would provide {this_DT car_NN, is_VB, really_RR, great_JJ}. Assuming the appropriate polarity lexicon, additional information would be added thus: {this_DT, car_NN, is_VB, really_RR, great_JJ;+} where '+' indicate a positive lexical item. Note that features are encoded in a simplified frame structure which is a tree. The standard operations of unification (merging), test for unifiability and subsumption are available on these structures.

The chunking phase would bracket the token sequence as follows: {(this_DT)_DET, (car_NN)_BNP, (is_VB)_BVP, (really_RR, great_JJ)_BADJP}. Note that the basic chunk categories are {DET, BNP, BADVP, BADJP, BVP, OTHER}.

The interpretation phase then carries out two tasks: the elevation of semantic information from lower constituents to higher, applying negation logic where appropriate, and assembling larger constituents from smaller. Rules are applied in a certain order. In this example, a rule combining DET and BNP chunks would work first over the sequence, followed by a rule that forms verb phrases from BNP BVP BADJP sequences whenever polar information is found in a BADJP.

Note that there is a restriction of the applicability of rules related to the presence of polar features in the frames of at least one constituent (be it a BNP, BADJP, BADVP or BVP).

The simple syntactic patterns are: Predicative modification (it is good), Attributive modification (a good car), Equality (it is a good car), Polar clause (it broke my car).

Negation of the following types are captured by the system: Verbal attachment (it is not good, it isn't good), Adverbial negatives (I never really liked it, it is never any good), Determiners (it is no good), Superordinate scope (I don't think they made their best offer).

2.2 Advanced Polarity Detection—Semantic Interpretation of Syntactic Fragments Containing Polarity Terms In an advanced polarity detection process, once a syntactic structure has been built a lexicon is consulted to annotate the terminals with lexical information. The lexicon contains information describing the role that the word has in the context of interpreting polarity. This role is described as either:

a) an atomic feature representing a grounded interpretation for the lexical item; e.g. positive negative.

b) a function which is to be applied to any sub-interpretation during composition resulting in a new interpretation; e.g.; invert which takes as an argument an atomic interpretation and produces a resultant interpretation, e.g., invert(positive)->negative.

Such a set of lexical types may include:
Functions:
INVERT

INVERT-NEG: invert the polarity of a negative argument
INVERT-POS: invert the polarity of a positive argument
INTENSIFY-IF-INVERTED: intensify an inverted argument
NEGATIVE-IF-INVERTED: negate an inverted argument
POSITIVE-IF-INVERTED: make positive an inverted argument
NON-TRANSMITTING: block the application of inversion for this verb
INTENSIFY: intensify the argument
NEGATIVE-NO-INVERSION: negate if no inversions have yet been applied
FILTER: remove the interpretation from the composition
Atoms:
POSITIVE
NEGATIVE Composition is the process by which an interpretation is built up (via the application of functions, or via transmitting a child's interpretation to its parent) from the terminals in a syntactic tree to the root of the tree.

Illustrative examples of semantic interpretation follow.
Syntactic Analysis
1. The input is segmented into a series of sentences
2. Each sentence is tokenized to produce a series of word-like elements.
3. Each token is given a part of speech (POS) which is encoded using a two or three character tag, e.g., NN for singular noun, NNP for plural noun.
4. Each token is looked up in a lexicon. The lexicon uses the POS and morphological analysis of the word. The morphological analysis takes as input a word and a POS and produces a reduced form of the word and the appropriate derived POS. For example, looking up 'breaking' would produce the token 'break' with the associated POS VB.
5. A grammatical analysis is performed on the entire sentence. The goal of the grammatical analysis is to diagram as much of the sentence as possible. In certain situations, the sentence will be fully described as a single structure. Otherwise, the structure will be fragmented.

Example—Given the following communication, "I heard this was a great movie. Did you like it?" The above steps are applied as follows:
1. 'I heard this was a great movie.' and 'Did you like it?'
2. Taking the first sentence—'I', 'heard', 'this', 'was', 'a', 'great', 'movie', '.'
3. I\PRP heard\VBD it\PRP was\VBD a\DT great\JJ movie\NN where PRP is personal noun, VBD is a past tense verb, DT is a determiner, JJ is adjective and NN is noun.
4. The only word that matches with the lexicon is 'great'.
5. Using a bracketing notation to indicate structure, the sentence can be represented as follows:

((I) (heard (this (was (a great movie)))))

NP            NP

VP

S-REL

VP

S

The notation below the bracketed form shows how the sentence is built up. The sentence consists of an NP—the subject Noun Phrase—(I) and a VP the main Verb Phrase (hears this was a great movie. The VP is then further split into a verb (heard) and a relative clause (S-REL) which itself has a simple Subject Verb Object sentence structure.

Semantic Analysis. Now that we have the structural and lexical description of the sentence, we can carry out a semantic analysis. The semantic analysis works in a simple compositional manner working from the nodes at the leaves of the tree structure (starting with the words themselves and moving through the tree to the very top node).

In the above example, nothing too interesting happens. The node 'great' has found a hit with a positive term in the lexicon. It is, therefore, associated with the 'positive' feature. This feature is, via the compositional analysis mechanism, propagated all the way up the tree to the top S node. The result is that the 'positive' feature is the only polarity feature present and thus the sentence is marked as being positive.

A more interesting case concerns the interaction of different lexical items. If we look at the fragment:

'it was not a good movie'

As before, 'good' finds a hit in the lexicon and gets the 'positive' feature. 'not' also finds a hit in the lexicon and gets assigned the *function* 'INVERT( )'. The 'positive' feature associated with 'good' is an *atomic* feature.

The structural analysis for this fragment is something like ((it) ((was not) (a good movie)))

As before, "a good movie" which is a noun phrase, gets associated with the 'positive' feature. The INVERT( ) function, that the word 'not' hit in the lexicon makes its way up to the verbal group ('was not'). The higher level node, a Verb Phrase that spans all of 'was not a good movie' has two children: 'was not' and 'a good movie'. If we reduce these children to their semantic information, we have to two expressions: 'INVERT( )' and 'positive'. The combinatorial process applies the function to the atomic argument and evaluates the result. Thus 'INVERT( )' and 'positive' become 'INVERT (positive)' which then becomes 'negative'. Just like the 'positive' feature in the earlier example, this 'negative' feature then makes its way up the tree structure to the top S node, resulting in a sentence with negative polarity.

More information about novelty of lexicon/semantics. When a word or phrase is looked up in the lexicon, the POS and the context surrounding it may be consulted. The POS allows the system to distinguish between the grammatical function of the word (e.g. 'pretty' in 'it was pretty' and 'pretty' in 'it was pretty horrible'). The context, when appropriate, can be used to distinguish other cases, such as the difference between 'well' in 'it works well' and 'well' in 'oh, well'. These contextual distinctions are made using a simple set of per entry rules which require the presence or absence of certain words either preceding or following the lexical entry.

Specifically, when word (ordinal) w is looked up in a sentence of n>w words, the lexicon has access to all the words in the sentence and can address them relative to the position w.

3. Polarity Evaluation

We wish to evaluate three aspects of our approach: the performance of the topic classifier on sentences, the performance of the polarity recognition system and the assumption that polar sentences that are on topic contain polar language about that topic.

Our evaluation experiment proceeded as follows. Using our message harvesting and text mining toolkit, we acquired 20,000 messages from online resources (usenet, online message boards, etc.). Our message harvesting system harvests messages in a particular domain (a vertical industry, such as 'automotive', or a specific set of products). Messages are then automatically tagged according to some set of topics of interest to the analyst.

We selected those messages which were tagged as being on topic for a particular topic in the domain being studied (982 messages). These messages were then segmented into sentences (using a naive sentence boundary detection algorithm) resulting in (16,616 sentences). The sentences were then tagged individually by the topic classifier (1,262 sentences on topic) and the polarity recognition system described above in Section 2.2.

We then selected at random 250 sentences for each of the evaluation tasks (topic, polarity, topic & polarity) and hand labeled them as follows.

polarity: positive, negative (in a multi-label environment this results in four possible combinations).

topic: topical, off-topic (a binary labeling).

topic and polarity: positive-correlated, negative-correlated, positive-uncorrelated, negative uncorrelated, topical, off-topic. The positive-correlated label indicates that the sentences contained a positive polar segment that referred to the topic, positive-uncorrelated indicates that there was some positive polarity but that it was not associated with the topic in question.

As our system is designed to detect relative degrees of opinion we are more interested in precision than recall. A greater issue than recall is the potential bias that our set of classifiers might impose on the data. This aspect is not measured here due to the labor intensive nature of the task.

The results for the polarity task from this hand labeling are shown in Table 1. Sentences judged to have positive polarity were detected with a precision of 82%. Negative sentences were judged to be detected with a precision of 80%.

TABLE 1

Precision of polarity for hand labeled sentences. Positive: 82%: negative: 80%

| | | predicted | |
|---|---|---|---|
| | | pos | Neg |
| truth | pos | 139 | |
| | notPos | 30 | |
| | neg | | 70 |
| | notNeg | | 17 |

4. Identifying Topical Sentences with a Document Classifier

In the previous section we approached the task of assessing the sentiment of a sentence through a shallow NLP approach. In this section, we take a different approach for determining the topicality of a sentence. We treat the topicality judgment as a text classification problem and solve it with machine learning techniques.

In the standard (prior art) text classification approach, representative training examples are provided along with human judgments of topicality. From these, a learning algorithm forms a generalization hypothesis that can be used to determine topicality of previously unseen examples. Typically, the types of text that form the training examples are the same type as those seen during the evaluation and application phases for the classifier. That is, the classifier assumes the example distribution remains constant before and after training.

4.1. Classifying Topical Messages

In an exemplary embodiment of our text mining system for a specific marketing domain, a machine learning text classifier is trained to assess topicality on whole messages and thus expects to predict whether or not a whole message is relevant to the given topic. In this section we explore how to use such a text classifier trained on whole messages to accurately predict sentence-level topicality.

The provided classifier is trained with machine learning techniques from a collection of documents that have been hand-labeled with the binary relation of topicality. The underlying classifier is a variant of the Winnow classifier (N. Littlestone, "Learning quickly when irrelevant attributes abound: A new linear-threshold algorithm," *Machine Learning* 2, pp. 285-318, 1988; A. Blum, "Empirical support for winnow and weighted-majority based algorithms: results on a calendar scheduling domain," *Machine Learning* 26, pp. 5-23, 1997; and I. Dagan, Y. Karov, and D. Roth, "Mistake-driven learning in text categorization," in *EMNLP '97, 2nd Conference on Empirical Methods in Natural Language Processing,* 1997), the disclosures of which are incorporated herein by reference, an online learning algorithm that finds a linear separator between the class of documents that are topical and the class of documents that are irrelevant. Documents are modeled with the standard bag-of-words representation that simply counts how many times each word occurs in a document. Winnow learns a linear classifier of the form:

$$H(x) = \sum_{w \in V} f_w c_w(x) \qquad \text{Equ. 1}$$

where $c_w(x)$ is 1 if word w occurs in document x and 0 otherwise. $f_w$ is the weight for feature w. If h(x)>V then the classifier predicts topical, and otherwise predicts irrelevant. The basic Winnow algorithm proceeds as:
1. Initialize all $f_w$ to 1.
2. For each labeled document x in the training set:
2a. calculate H(x).
2b. If the document is topical, but Winnow predicts irrelevant, update each weight $f_w$ where $c_w(x)$ is 1 by:

$$f_w *= 2 \qquad \text{Equ. 2}$$

2c. If the document is irrelevant, but Winnow predicts topical, update each weight $f_w$ where $c_w(x)$ is 1 by:

$$f_w /= 2 \qquad \text{Equ. 3}$$

In a setting with many irrelevant features, no label noise and a linear separation of the classes, Winnow is theoretically guaranteed to quickly converge to a correct hypothesis. Empirically, we have found Winnow to be a very effective document classification algorithm, rivaling the performance of Support Vector Machines (T. Joachims, "Text categorization with support vector machines: Learning with many relevant features," in *Machine Learning: ECML98, Tenth European Conference on Machine Learning,* pp. 137-142, 1998, the disclosure of which is incorporated herein by reference) and k-Nearest Neighbor (Y. Yang, "An evaluation of statistical approaches to text categorization," *Information Retrieval* 1(1/2), pp. 67-88, 1999, the disclosure of which is incorporated herein by reference), two other state-of-the-art text classification algorithms. In the exemplary embodiment, we use Winnow because it is more computationally efficient than SVMs and easier to apply than kNN. It is to be understood, of course, that it is within the scope of the invention to use classifiers other than the Winnow algorithm.

4.2. Classifying Topical Sentences

In the exemplary embodiment, after determining whether the whole message is considered relevant or irrelevant, we then use a straightforward and ad-hoc technique of adapting a given document classifier into a high precision/low recall sentence classifier. If a document is judged by the classifier to be irrelevant, we predict that all sentences in that document are also irrelevant. If a document is judged to be topical, then we further examine each sentence in that document. Given each sentence and our text classifier, we simply form a bag-of-words representation of the sentence as if an entire document consisted of that single sentence. We then run the classifier on the derived pseudo-document. If the classifier predicts topical, then we label the sentence as topical and proceed with the sentiment analysis for that sentence. If the classifier predicts irrelevant, we skip the sentiment analysis and proceed on to the next sentence.

4.3. Experiment Results and Discussion

To evaluate this exemplary embodiment, we use the same experimental setup as described in the previous section. We trained a Winnow classifier by hand-labeling 731 training messages, 246 which were topical. Then, on our test collection, 982 messages were predicted to be topical by the classifier. Precision was measured at 85.4% (117/137 on a randomly selected test set) on the message level. The 982 messages contained 16,616 sentences, 1262 of which were judged to be topical by the classifier. These sentences came from 685 different documents, indicating that that 70% of documents judged to be topical also had at least one sentence predicted to be topical. A random sample of 224 of the 1262 topical sentences were hand labeled. Precision on this set was estimated at 79% (176/224). These results show that applying a message-level classifier in a straightforward fashion on the sentence level still maintains about the same precision that was seen on the document level. However, this approach clearly results in a loss of recall, as a significant number of messages predicted to be topical did not have any sentences predicted as topical.

4.4 Brand Specific Topical Polar Messages

This section describes how we use the polar sentence detector and identify which messages contain positive or negative expressions about a particular brand. The approach we take is to use a brand text classifier, a feature text classifier, and a set of resolution heuristics to combine these with the polar language detector.

In a marketing intelligence application of data mining, there are typically topics of discussion in the data that warrant explicit tracking and identification. The most prevalent type of topics are brand-related, i.e. one topic for each product or brand being tracked, such as the Dell Axim. To facilitate this taxonomic requirement, analysts compose well-written hand-built rules to identify these types of topics. These rules are based on words and phrases, and allow for stemming, synonymy, windowing, and context-sensitivity based on document analysis.

From one point of view, these brands are entities occurring in the text, and it might be considered that entity extraction would be the most appropriate technology to apply. However, to facilitate tracking and identification, extracted entities must be normalized to a set of topics. For example, Axim, Dell Axim, and the Dell PDA should all fall into the Dell Axim topic. An approach following that of Cohen, W. W., "Data Integration Using Similarity Joins and a Word-Based Information Representation Language," *ACM Transactions of Information Systems* 18(3):288-321 (2000), the disclosure of which is incorporated herein by reference, could be established to automatically normalize entities. However, since our customers typically know exactly which brands they want to monitor, pre-building the rules in this case is both more accurate and the performance is more predictable and can be easily measured.

As discussed above, we showed that in the domain of online message discussion, intersecting sentiment with topic classifiers at the sentence level provides reasonable precision. That is, if a sentence in a message is both about a brand (according to its classifier) and also contains positive language (as detected by our sentiment analysis) our system asserts that the message is positive about that brand. Other NLP approaches to sentiment do a finer-grained grammatical analysis to associate sentiment with a topic. We have found that in the domain on online discussion, using a sentence intersection approach has reasonably high precision, and also better recall than a grammatical association approach. However, the recall is still relatively low, and thus we extend the recall through a second layer of classification and resolution. A second set of "feature classifiers" is defined to recognize discussion about features of a brand within the given industry. For example, in the automotive domain, there might be classifiers for acceleration, interior styling, and dealership service.

In contrast to brand-like topics defined through rules, it's often the case that other topics are more accurately recognized from a complex language expression that is not easily captured by a rule. For example, topics such as Customer Service are not so simply captured by sets of words, phrases and rules. Thus, we often approach topic classification with machine learning techniques. The provided classifier is trained with machine learning techniques from a collection of documents that have been hand-labeled with the binary relation of topicality. The hand-labeling by the analysts is performed using an active learning framework. The underlying classifier is a variant of the Winnow classifier (Littlestone 1988), an online learning algorithm that finds a linear separator between the class of documents that are topical and the class of documents that are irrelevant. Documents are modeled with the standard bag-of-words representation that discards the ordering of words and notices only whether or not a word occurs in a document.

These "feature classifiers" are used to extend the recall of identifying polar messages through the following process. If a message contains brand mentions, the feature classifiers are also run on each sentence in a message. If a sentence is both polar and passes a feature classifier, there is likely a polar expression about one of the brands mentioned in the message. A process of fact extraction is layered on top of these classifiers and the sentiment analysis to understand which brand is being referenced in the message. We use simple resolution techniques to associate brand-like topics (e.g. Dell Axim) with topics describing features of brands (e.g. Customer Service or Peripherals). For example, a brand can be referenced in the Subject line of a blog, and feature-like topics mentioned in the body of the blog resolve back to the brand topics in the subject line when other brands are not mentioned in the body. In this way, we identify facts that can be thought of as triples of brands, their (optional) features, and the (optional) polarity of the authorial expression.

For purposes of measuring aggregate sentiment for a brand, a message is considered positive about the brand if it contains a fact with the brand's class and a positive polarity. A message is considered negative about the brand if it contains a fact with the brand's class and a negative polarity. While generally correct, the automated nature of the system results in a not insignificant amount of error in claiming these facts. Aggregating these counts into a single overall score for a brand requires a mindfulness of the error rates, to avoid making incorrect claims about a brand. Below we describe how the counts of each of these groups of messages is used to generate a score with confidence bounds that achieves this goal.

4.5. Other Embodiments of Identifying Topical Sentences

An alternate embodiment for identifying topical sentences is to use a hand-built set of rules to identify sentences containing a topic. For example, to identify the display of a PDA, an analyst might write the rule "the word 'screen' within" five words of the word 'PDA', the word 'resolution', the phrase 'trans reflective' but not the phrase 'monitor resolution'. These rules can be run over every sentence in the document collection, and any sentence that matches the hand-written rule is considered topical.

Figure 5:
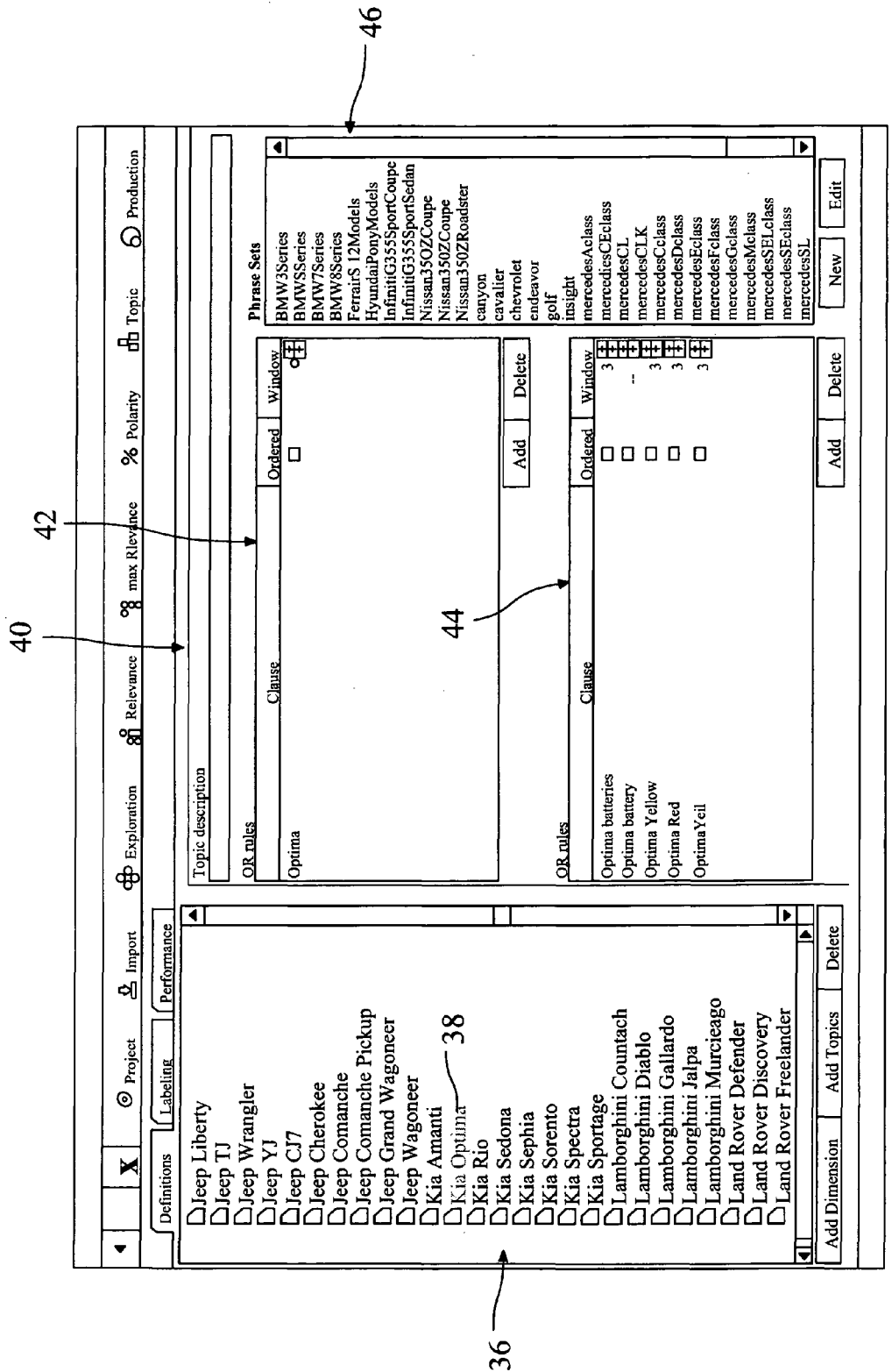
FIG. 5 is a graphical user interface screen view from an exemplary computerized tool for implementing certain embodiments of the present invention, showing how rule-based classifiers may be built.

FIG. 5 shows a screen shot of an exemplary computerized tool for writing topical rules of this kind.

5. Polarity and Topic

One goal of the present invention is to reliably extract polar sentiments about a topic. An embodiment of our system assumes that a sentence judged to be polar and also judged to be topical is indeed expressing polarity about the topic. This relationship is asserted without any NLP-style evidence for a connection between the topic and the sentiment, other than their apparent locality in the same sentence. This section tests the assumption that at the locality of a sentence, a message that is both topical and polar actually expresses polar sentiment about the topic.

TABLE 2

Topic/Polarity combinations: 72% precision
(72% for positive, 71% for negative)

|  |  | predicted | |
|---|---|---|---|
|  |  | topic & positive | topic & negative |
| truth | topic & positive | 137 |  |
|  | other | 52 |  |
| truth | topic & negative |  | 37 |
|  | other |  | 15 |

Using the polarity and topic modules described and tested in the previous sections, the system identifies sentences that are judged to be topical and have either positive or negative sentiment. These sentences are predicted by the system to be saying either positive or negative things about the topic in question. Out of the 1262 sentences predicted to be topical, 316 sentences were predicted to have positive polarity and 81 were predicted to have negative polarity. The precision for the intersection—testing the assumption that a topical sentence with polar content is polar about that topic—is show in Table 2, above. The results show the overall precision was 72%. Since the precision of the polarity module was 82% and the topic module 79%, an overall precision of 72% demonstrates that the locality assumption holds in most instances.

Below are five randomly selected sentences predicted to be negative topical and five randomly selected sentences predicted to be positive topical. These show typical examples of the sentences discovered by our system.

Negative Sentences:
Compared to the PRODUCT's screen this thing is very poor.
In multimedia I think the winner is not that clear when you consider that PRODUCT-A has a higher resolution screen than PRODUCT-B and built in camera.
I never had a problem with the PRODUCT-A, but did encounter the "Dust/Glass Under The Screen Problem" associated with PRODUCT-B.

broken PRODUCT screen
It is very difficult to take a picture of a screen.
Positive Sentences:
The B&W display is great in the sun.
The screen is at 70 setting (255 max) which is for me the lowest comfortable setting.
At that time, superior screen.
Although I really don't care for a cover, I like what COMPANY-A has done with the rotating screen, or even better yet, the concept from COMPANY-B with the horizontally rotating screen and large foldable keyboard.
The screen is the same (both COMPANY-A & COMPANY-B decided to follow COMPANY-C), but multimedia is better and more stable on the PRODUCT.

6. A Generative Model for Observing Polar Expressions 6.1 Confidence Scoring

Given a set of messages about brand X, previous sections describe how we determine (with some error) whether each message is positive, negative, mixed or neutral about brand X. The end sentiment metric is a function of the estimated frequency of positive messages, and the estimated frequency of negative messages. The simplest measure of positive frequency would be to just divide the number of positive messages about brand X by the total number of messages about brand X. This approach may be undesirable in two important ways. First, the analysis determining positive is error-prone, and the error rates of this are not accounted for. Second, with small amounts of data, the true underlying frequency may be quite far from the measured frequency. In this section we describe how we use Bayesian statistics to model these properties to derive valid estimates for the positive and negative frequencies.

The model we choose is a statistical generative model. That is, we assume the facts are extracted by an error-prone process that we model with explicit parameterization. Specifically for the sentiment metric, the fundamental parameter we hope to derive is the frequency of positive messages about a brand, and the frequency of negative messages about a brand. These two processes are modeled analogously; for brevity we discuss here only the derivation of the frequency of positive messages, but one of ordinary skill will readily appreciate how to derive the frequency of negative messages using this model.

We model a generative process for facts about brand X by assuming that the positive frequency over all brands is modeled by a Beta distribution, and brand X's positive frequency, $\Theta$ is determined by a draw from this Beta distribution. Given the data D consisting of N messages about the brand, n of these are truly positive, determined by a draw from a Binomial distribution, Binomial(N, $\Theta$).

The observation process of fact extraction makes two types of errors: (1) false positives, observing a true neutral as a positive, and (2) false negatives, observing a true positive as a neutral. Let these error rates be $\epsilon_{fp}$ and $\epsilon_{fn}$ respectively. By observing N messages through the error-prone lens of fact extraction, we see m positive messages instead of the correct number n. Let fp, fn, tp and tn be the number of false positive, false negative, true positive and true negative messages observed. Note that these are unknown from the observations, though we do know that:

$$tp+fp=m \qquad \text{Equ.4}$$

$$tn+fn=N-m \qquad \text{Equ.5}$$

The goal of the parameter estimation process is to use the observed values N (total messages) and m (positive messages detected) and estimate $\Theta$, the underlying frequency of true positive messages. As we are calculating this from a Bayesian perspective, we derive not only a maximum a posteriori estimate $\hat{\Theta}$, but also a posterior distribution over $\Theta$, which will be important in estimating the size of the confidence bounds.

Given the data, we estimate e through an application of Bayes' rule and Expectation-Maximization. The posterior probability of $\Theta$ is:

$$P(\Theta|D) \propto P(\Theta)P(D|\Theta) \qquad \text{Equ. 6}$$

$$\propto \text{Beta}(\Theta)\frac{1}{Z}\Theta^n \varepsilon_{fn}^{fn}(1-\varepsilon_{fn})^{tp}(1-\Theta)^{N-n}\varepsilon_{fp}^{fp}(1-\varepsilon_{fp})^{tn} \qquad \text{Equ. 7}$$

where Z is a normalization function of fp, fn, tp and tn.

This likelihood equation can be maximized through a straightforward application of expectation-Maximization. Dempster, A. P.; Laird, N. M.; and Rubin, D. B. "Maximum Likelihood from Incomplete Data via the EM Algorithm." *Journal of the Royal Statistical Society, Series B* 39(1): 1-38 (1977), the disclosure of which is incorporated herein by reference. In the general case, the EM iterative process will solve for a local maxima to a likelihood equation with missing data. In this application, each datapoint's true sentiment is unknown, and only the observed sentiments are known.

The M-step estimates $\Theta$ using the expectations of the missing values of the data:

$$\hat{\Theta} = \frac{E[tp]+E[fn]+\alpha}{N+\alpha+\beta} \qquad \text{Equ. 8}$$

where $\alpha$ and $\beta$ are parameters given by the Beta prior for the Binomial distribution.

The E-step calculates the expectation of the missing data using the estimated parameterization:

$$E[tp] = m\left(\frac{\hat{\Theta}(1-\varepsilon_{fn})}{\hat{\Theta}(1-\varepsilon_{fn})+(1-\hat{\Theta})\varepsilon_{fp}}\right) \qquad \text{Equ. 9}$$

$$E[fp] = m\left(\frac{(1-\hat{\Theta})\varepsilon_{fp}}{\hat{\Theta}(1-\varepsilon_{fn})+(1-\hat{\Theta})\varepsilon_{fp}}\right) \qquad \text{Equ. 10}$$

$$E[tn] = (N-m)\left(\frac{\hat{\Theta}\varepsilon_{fn}}{\hat{\Theta}\varepsilon_{fn}+(1-\hat{\Theta})(1-\varepsilon_{fp})}\right) \qquad \text{Equ. 11}$$

$$E[fn] = (N-m)\left(\frac{(1-\hat{\Theta})(1-\varepsilon_{fp})}{\hat{\Theta}\varepsilon_{fn}+(1-\hat{\Theta})(1-\varepsilon_{fp})}\right) \qquad \text{Equ. 12}$$

By iterating the E-steps and M-steps until convergence, we arrive at a local maxima in likelihood space, giving us an estimate for $\Theta$. Additionally, at this fixed point, we have also arrived at a posterior distribution:

$$P(\Theta|D)=\text{Beta}(E[tp]+E[fn]+\alpha,E[tn]+E[fp]+\beta) \qquad \text{Equ. 13}$$

This is not mathematically the true posterior distribution, as it does not account for the uncertainty in the estimation of which messages were erroneously or correctly observed. We have empirically observed much success in using this approximation.

Four parameters of this model are set through empirical methods: $\epsilon_{fp}$, $\epsilon_{fn}$, $\alpha$, and $\beta$. Both $\epsilon_{fp}$ and $\epsilon_{fn}$ are set by simply measuring these over a set of labeled data. Both α and β are estimated through a process of setting empirical priors using large sets of unlabeled data.

The process described is a method for deriving estimates for the positive and negative frequencies of a brand. However, customer needs require that only a single summary statistic be produced, and that the form of this is a 1-10 metric. Additionally, a 5.0 value of the metric needs to correspond to the case where the estimated frequencies of positive and negative are equal, and generally, very few brands should score at the most extreme ends of the score. The frequencies are converted to a 1-10 score through a log linear normalization of the ratio of positive to negative. Thus, if a 7.0 corresponds to a ratio of 2.0, then 9.0 corresponds to a ratio of 4.0 and a 3.0 score to a ratio of 0.5. Extreme ratios are very rare, and anything beyond a 1 or a 10 are simply truncated at the extrema.

To measure the confidence bounds of a sentiment score estimated by this process, we use the posterior distribution of the positive and negative frequencies. We estimate 95% confidence bounds by repeatedly sampling from these posterior distributions, and then plugging this into the 1-10 conversion metric. It's extremely fast to sample this 1000 times, and select the 2.5% and 97.5% lower and upper bounds to set a 95% confidence interval. This process implicitly makes the assumption that the distribution of positive frequency and negative frequencies are independent. While somewhat of a simplification, we have found this process to hold up well empirically.

6.2 Empirical Validation

This section presents empirical results of the polarity metric with confidence bounds in two different domains. We also demonstrate that the confidence bounds are well-behaved, and necessary for good interpretation of comparisons between brands.

One important industry for Intelliseek is the automotive industry. To this extent, we have configured a system to recognize all currently-available auto makes and models. in addition, we have defined a number of classifiers for automotive features, from physical characteristics such as interior styling, to leasing and dealerships, to more intangible items like customer service. Table 3 displays message counts, sentiment scores, and sentiment confidence bounds for a sampling of auto brands, as determined by the algorithms described in the previous section. The table shows numbers for a time-constrained set of messages. By analyzing just a small timeframe, the message counts can be somewhat small, which highlights the needs for the confidence bounds on the metric.

TABLE 3

| Model | # Messages | Sentiment | Bounds |
| --- | --- | --- | --- |
| Mazda Mazda6 | 568 | 8.0 | 1.2 |
| Infiniti G35 | 292 | 7.9 | 1.7 |
| Hyundai Sonata | 212 | 7.7 | 2.2 |
| Audi A4 | 431 | 7.3 | 1.2 |
| BMW M3 | 504 | 7.0 | 1.0 |
| Toyota Corolla | 684 | 6.6 | 0.8 |
| Honda Odyssey | 317 | 6.6 | 1.3 |
| Toyota Celica | 276 | 6.4 | 1.3 |
| Ford F150 | 412 | 6.2 | 0.9 |
| Honda S2000 | 543 | 6.2 | 0.8 |
| Honda Accord | 1951 | 5.8 | 0.5 |
| Nissan Altima | 444 | 5.2 | 1.1 |
| Honda Civic | 1212 | 5.0 | 0.6 |
| Honda CR-V | 274 | 4.5 | 1.2 |
| Dodge Ram | 248 | 4.5 | 1.5 |
| Volkswagen Jetta | 505 | 4.3 | 0.9 |
| Ford Taurus | 469 | 3.7 | 1.1 |

The above Table 3 shows the results of the sentiment metric applied in the auto domain. Note that in general, models with larger message counts have smaller confidence bounds. Using these scores to drive analysis, yields insights that explain the relative rankings of the different models.

By drilling down on some of the backing data for sentiment scores, it is possible to understand why specific models were rated highly or lowly. By investigating further, we find that the Mazda 6 (a highly rated model) had a number of positive comments surrounding its performance and styling in the sports sedan market:

I think the Mazda 6 is the best value for a sports sedan
The Mazda 6 is one of the best handling FWD autos
The Mazda6 MPS achieves a superior balance between high performance and daily needs such as comfort and economy.
That car is soo good lookin!
Power and torque are faithfully and thoroughly transferred to the road surface for maximum efficiency.

The Ford Taurus, a lower rated model, received a number of complaints about quality issues and begin generally out of date:

I had three separate Tauruses with leaky rear main seals.
The Taurus in a failure.
The standard spoiler is too small.
The power steering always whined, even with enough fluid.
The Taurus should have been put out of its misery S years ago.

TABLE 4

| Destination | # Messages | Sentiment | Bounds |
| --- | --- | --- | --- |
| Aruba | 539 | 9.7 | 1.4 |
| Antigua | 944 | 8.8 | 1.2 |
| St. Lucia | 687 | 8.3 | 1.2 |
| St. Bart's | 116 | 7.7 | 2.6 |
| Barbados | 1440 | 6.8 | 0.9 |
| Grand Bahama | 3384 | 6.4 | 0.5 |
| Jamaica | 5479 | 5.9 | 0.4 |
| Cuba | 2435 | 5.3 | 0.8 |
| Grand Cayman | 492 | 5.1 | 1.7 |

The above Table 4 illustrates Results of the sentiment metric in measuring aggregate opinion about Caribbean vacation destinations.

Table 4 shows the results of measuring polarity for location topics in a small data set of messages about Caribbean destinations. By further drilling down on these scores, an analyst can quickly determine that:

Aruba scores well due to a good general opinion of dining out, snorkeling and beach activities.
Cuba has a lower score due to poor snorkeling and beach activities.
Grand Bahama's medium score comes from above average opinion of snorkeling, moderate opinion of dining out and a slightly lower opinion of beach activities.

Figure 7:
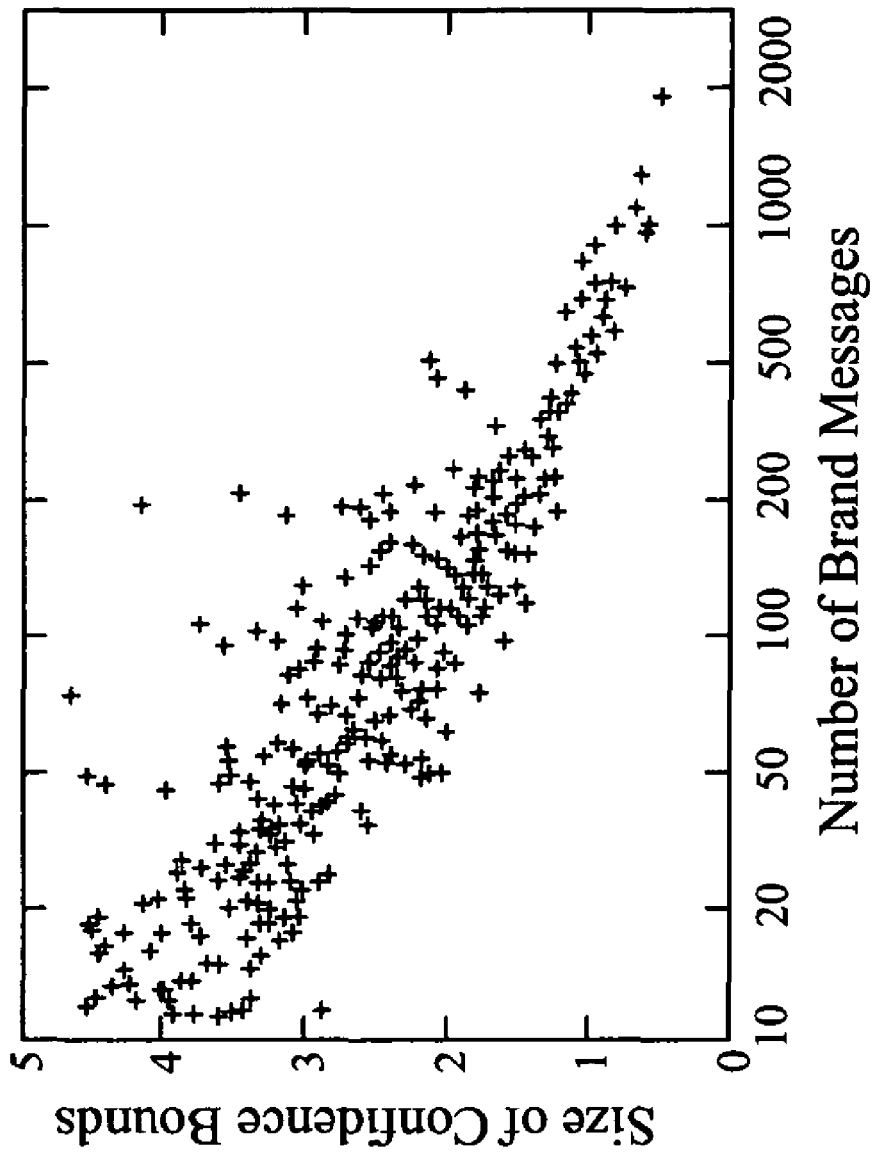
FIG. 7 is a scatter-plot graph showing an analysis of confidence bounds by the amount of message volume about a brand.

FIG. 7 provides a scatterplot showing how the size of the confidence bounds is influenced by the number of messages. Each point is an automotive model. Once there are about 1000 messages for a topic, the 95% confidence bounds tend to be within 1.0 on a ten point scale.

FIG. 7 shows an analysis of the confidence bounds by the amount of message volume about a brand. The x-axis shows the number of messages about a brand, and the y-axis shows the estimated size of the 95% confidence bounds. With a very small amount of data for a brand, the confidence bounds on each brand tend to be rather large. This generally will prevent conclusive expressions to be made by comparing sentiment scores with these large confidence bounds. As the message volume gets larger, the bounds get smaller, and thus it becomes easier to make statistically valid conclusions based on these scores.

7. Demonstration of User Interface

Figure 1:
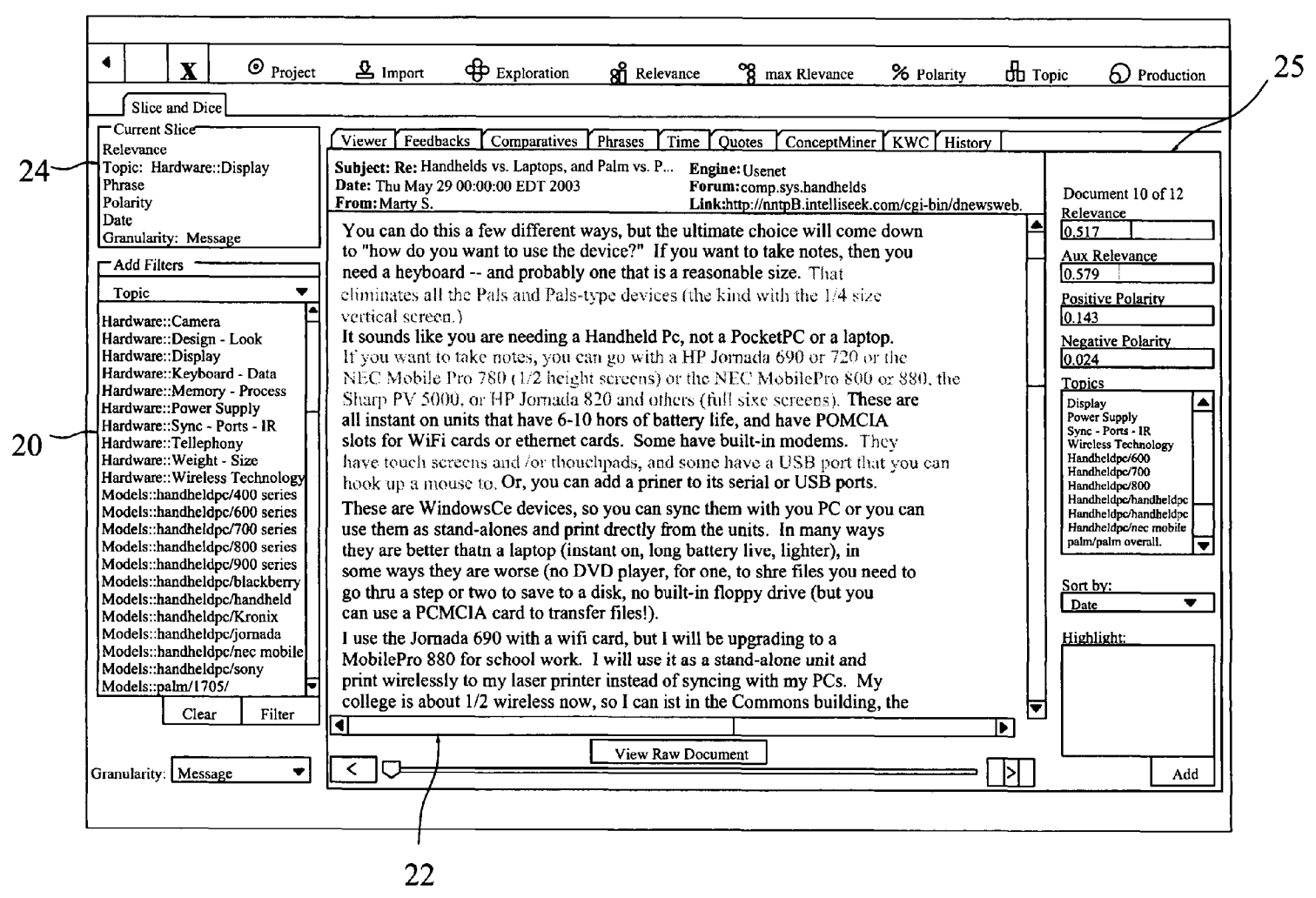

FIGS. 1-4 provide screen shots of an exemplary computerized tool for implementing certain embodiments of the present invention.

The screen shot of FIG. 1 illustrates a function of the exemplary computerized tool establishing a topic for the text mining algorithm contained therein. Three main features visible in this screen view are the Topic Select window 20, the Viewer window 22, and the Current Slice box 24. The Topic Select window 20 lists the available topics from which the user may select a topic for analysis. The Viewer window 22 displays the text of a particular message. The Current Slice box 24 provides status information regarding the user's selections that define the research project that is being performed. In the example shown, the Current Slice box 24 indicates that the Topic selected by the user is "Hardware::Display". With this selection, the exemplary computerized tool will concentrate on certain characteristics regarding a manufacturer's electronic device (in this case, a PDA) or the competing electronic devices of the manufacturer's competitors. The tool has access to a repository of thousands or millions of interne message-board entries preselected as likely having content of interest (e.g., taken from interne message boards dedicated to electronic devices and/or PDAs). The Viewer window 22 provides an example message found by the above-described text mining tool in the repository of messages that the text mining tool considered relevant to the selected topic.

In the FIG. 1 screen view, the right-side block 25 displays data pertaining to the analysis of the currently selected message contents. The Relevance, Aux Relevance, Positive and Negative Polarity displays show a score between zero and one for the currently selected message for each of these different types of scoring. Specifically, scores greater than zero for Positive and Negative Polarity mean that at least one sentence in the message has been identified as positive or negative, with a higher score indicating a higher degree of positivity or negativity identified in the message. The Relevance and Aux Relevance scores indicate a confidence that the message is about the selected topic (PDA's and Pocket PCs in this example). Messages that are below a specified threshold of relevance can be excluded.

The screen shot of FIG. 2 illustrates a function of the exemplary computerized tool in which the user may establish a more specific aspect of the general topic selected in the screen of FIG. 1. The Viewer window 22 and Current Slice box 24 appear again and serve the same purpose as described above with reference to FIG. 1. However, there is now a Phrase-select window 26, which allows the user to enter a word or group of words to specify the content to be analyzed in the messages. In the example shown, the Current Slice box 24 indicates that the user has entered the phrase "resolution," thus indicating that the messages will be searched for comments relating to the resolution of the hardware displays. The Viewer window 22 provides an example message found by the above-described text mining tool in the repository of messages that the text mining tool considered relevant to the selected topic and phrase, with the selected phrase "resolution" appearing in highlighted text 26.

Figure 3:
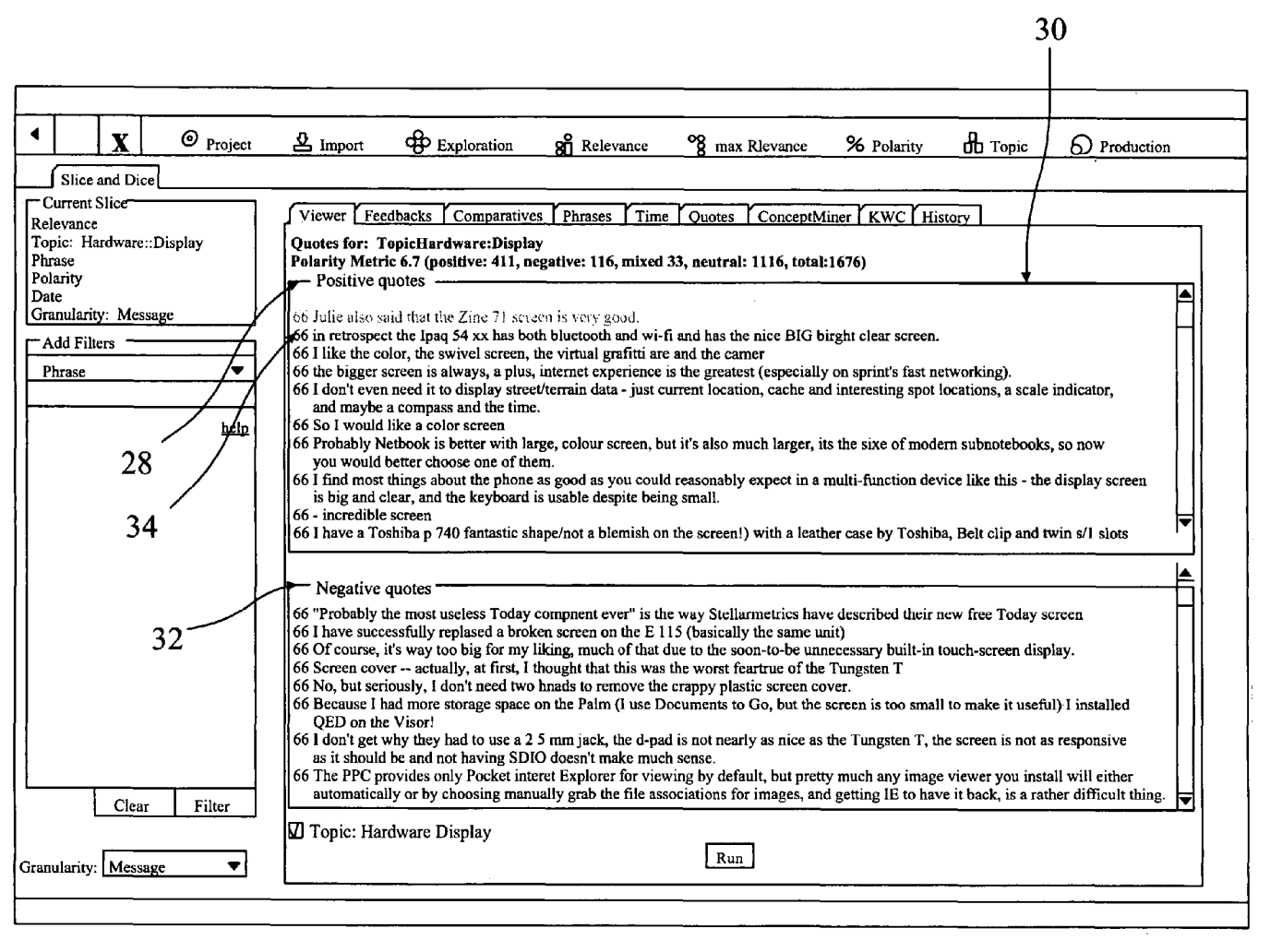

The screen shot of FIG. 3 illustrates a function of the exemplary computerized tool in which the user has requested the tool to illustrate the positive sentences and negative sentences located in the messages considered to be topical to the resolution of the customer's electronic device screen. The positive sentences found by the sentence classifier are listed under the "Positive Quotes" header 28 in the Quotes window 30 and the negative sentences found by the sentence classifier are listed under the "Negative Quotes" header 32 in the Quotes window 30. As can be seen by this example, not every sentence is directly on point, but there are certainly a substantial ratio of sentences that are on point versus those that are not. Additionally, the user has the ability to select one of the sentences, such as sentence 34 to view the entire message from which it was extracted as shown in the Viewer window of FIG. 4.

Figure 4:
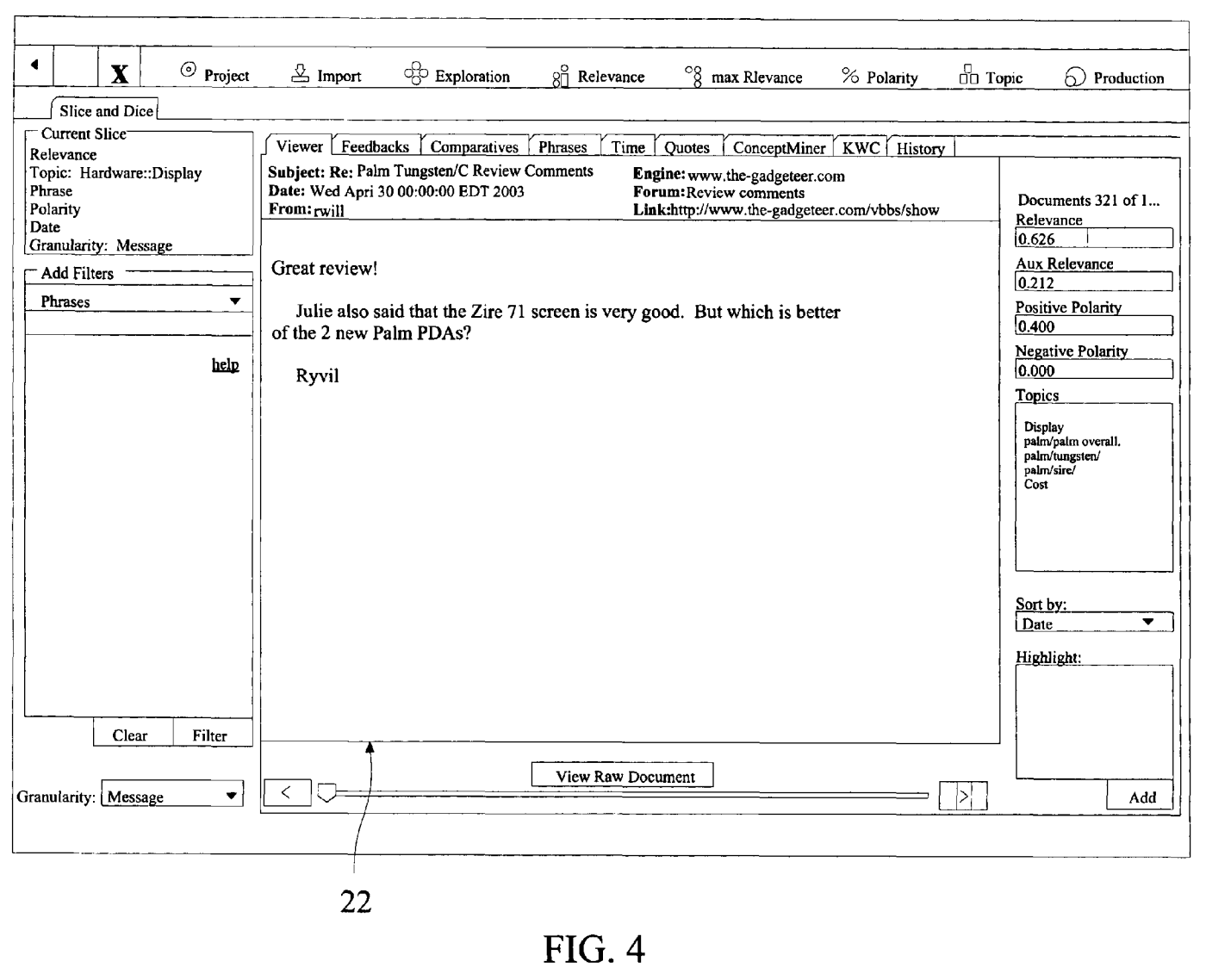

The screen shot of FIG. 4 shows the Viewer window 22 displaying the text of the message from which the comment 34 shown in FIG. 3 selected by the user originated.

The screen shot of FIG. 5 illustrates a demonstration of how rule-based classifiers may be built. This tool allows the user to define a topic (such as a particular brand or product) by creating a "rule" built from words to be associated with that topic. Such a rule can be used to search feedback or comment messages, with those messages that conform to the defined rule being identified as pertaining to the selected topic.

On the left-hand part of the FIG. 5 screen is a list 36 containing the different topics for which the topical sentiment analysis of the present invention may be performed. This list can be generated by a database and include topics for which feedback or comment is available. In the example shown, "Kia Optima" is the currently selected topic 38. The middle of the screen contains a window 40 for implementing the tool for writing rules to define the currently selected topic. The window 40 is further divided into an "OR Rules" block 42 and a "BUT-NOT Rules" block 44. Words appearing in the "OR Rules" block will be associated with the topic, such that feedback or comment messages containing any of these words will be identified as pertaining to the selected topic. Words appearing in the "BUT-NOT Rules" block will be given preclusive effect in the topic definition, such that the appearance of one of these words in a feedback or comment message will disqualify that message from pertinence to the selected topic. For example, the rule defined by the words shown in the "OR Rules" block 42 and "BUT-NOT Rules" block 44 of FIG. 5 can be stated as "A message is about the Kia Optima if the word 'Optima' appears in the message, but not if any of the phrases 'Optima batteries', 'Optima battery', 'Optima Yellow', 'Optima Red', or 'Optima Yell' appear in the message". When building rules, the user can type words to be added to the "OR Rules" block 42 and "BUT-NOT Rules" block 44, or the user can select words or phrase sets from the list 46 on the right side of the FIG. 5 screen. The list 46 is a collection of previously-entered or customized words and phrases, which can be used as shortcuts when writing a rule.

8. Process for Specializing a Lexicon for a Data Set

A standard lexicon may be applied to any data set. However, the results will be improved if the lexicon is tuned to work with the particular language of a domain. A system has been implemented to assist a user in carrying out this process.

1. Messages for the domain are collected (as part of the configuration process within the application housing the polarity system).

2. Messages are scanned to determine which words have the potential to be added to the lexicon.

3. The user is stepped through these candidate words and required to indicate if they accept or reject the word for the custom lexicon.

Step 2 above uses a number of methods to determine which words are to be used as candidates: (a) patterned based methods (Gregory Grefenstette, Yan Qu, David A. Evans and James G. Shanahan, *Validating the Coverage of Lexical*

*Resources for Affect Analysis and Automatically Classifying New Words Along Semantic Axes*, AAAI Symposium on Exploring Attitude and Affect in Text: Theories and Applications, 2004, the disclosure of which is incorporated herein by reference); and (b) commonly occurring adjectives and adverbs not found in the lexicon and not include in a default lexicon of known non polar terms.

In the pattern driven approach, a number of patterns are used to locate adjectives and adverbs which have a good chance of being polar. The patterns involve both tokens (words) and parts of speech. The patterns consist of a prefix of tokens and a target set of POS tags. The patterns are created from a pair of word pools. Pool one contains, for example, 'appears', 'looks', 'seems', pool two contains, for example, 'very', 'extremely'. The product of these pools (e.g. 'appears very', 'looks extremely' and so on) is then appended with one of the target POS tags (which select for adjectives and adverbs) giving a complete set of patterns (e.g. 'looks extremely 11' meaning the sequence of two tokens and a pas tag).

To populate the candidate list, the messages in the corpus collected for the project being customized is scanned using the patterns described above. All words which match any of the patterns are collected.

In a parameter driven approach, all adjectives and adverbs in messages which have already been marked as polar, and which have counts above a certain threshold, are added to the list of candidates.

Each of the above pattern driven and parameter driven approaches can be tuned using a filter which accepts only candidates Which appear a certain number of times in the corpus. By using these parameters, we create four candidate creation methods, two for each approach. The user then steps through the four sets of candidates, accepting or rejecting words as appropriate. The interface within which this is carried out presents the user with the word, its POS and a list of examples of that word appearing in contexts mined from the corpus of messages.

Figure 6:
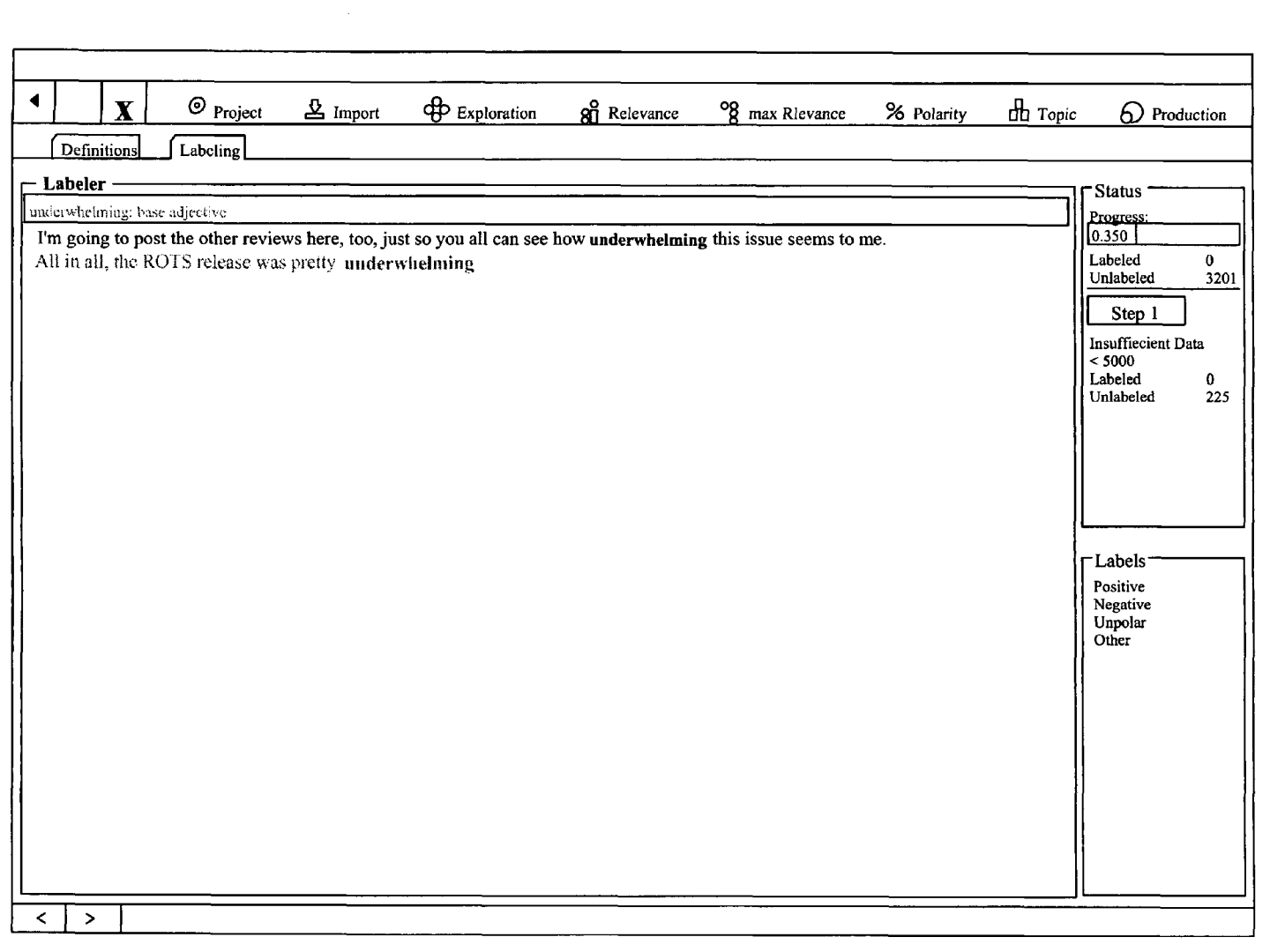

As shown in FIG. 6, an example screen shot shows such a system in use. The system is presenting the user with the word 'underwhelming' which has been generated in the first candidate generation step. The word is illustrated by two examples that have been pulled from the corpus of messages. The user labels the word either by keyboard or shortcuts, or by clicking on the appropriate label found in the bottom right hand corner of the display.

9. Conclusions

Determining the sentiment of an author by text analysis requires the ability to determine the polarity of the text as well as the topic. In these exemplary embodiment, topic detection is generally solved by a trainable classification algorithm and polarity detection is generally solved by a grammatical model. The approach described in some of these embodiments takes independent topic and polarity systems and combines them, under the assumption that a topical sentence with polarity contains polar content on that topic. We tested this assumption and determined it to be viable for the domain of online messages. This system provides the ability to retrieve messages (in fact, parts of messages) that indicate the author's sentiment to some particular topic, a valuable capability.

The detection of polarity is a semantic or meta-semantic interpretive problem. A complete linguistic solution to the problem would deal with word sense issues and some form of discourse modeling (which would ultimately require a reference resolution component) in order to determine the topic of the polar expressions. Our approach restricts these open problems by constraining the data set, and specializing the detection of polarity. These steps by no means address directly these complex linguistic issues, but taken in conjunction (and with some additional aspects pertaining to the type of expressions found in the domain of online messages) the problem is constrained enough to produce perfectly reliable results.

Following from the above description and invention summaries, it should be apparent to those of ordinary skill in the art that, while the systems and processes herein described constitute exemplary embodiments of the present invention, it is understood that the invention is not limited to these precise systems and processes and that changes may be made therein without departing from the scope of the invention as defined by the following proposed claims. Additionally, it is to be understood that the invention is defined by the proposed claims and it is not intended that any limitations or elements describing the exemplary embodiments set forth herein are to be incorporated into the meanings of the claims unless such limitations or elements are explicitly listed in the proposed claims. Likewise, it is to be understood that it is not necessary to meet any or all of the identified advantages or objects of the invention disclosed herein in order to fall within the scope of any proposed claims, since the invention is defined by the claims and since inherent and/or unforeseen advantages of the present invention may exist even though they may not have been explicitly discussed herein.

What is claimed is:

1. A system comprising:
a text mining tool to process text in an electronic document to identify a topical expression and a polar expression in the electronic document;
a text classifier to determine a topic of the topical expression and a polarity of the polar expression, to identify a relevance of the polar expression to the topical expression, and to generate a confidence score associated with the relevance of the polar expression to the topical expression; and
a user interface to display the topical expression with the polar expression and the confidence score to a user.

2. The system of claim 1, wherein the user interface is to display an aggregated plurality of topical expressions and corresponding polar expressions identified within the electronic document.

3. The system of claim 1, wherein the user interface is to display an aggregated plurality of topical expression and corresponding polar expressions identified from a plurality of electronic documents.

4. The system of claim 1, wherein the text mining tool is to perform a natural language processing analysis of the electronic document to identify a topical expression and a polar expression, and the text classifier is to perform a natural language processing analysis of the topical expression and the polar expression to identify a relevance of the polar expression to the topical expression and to generate a confidence score associated with the relevance of the polar expression to the topical expression.

5. The system of claim 1, wherein the text classifier comprises a statistical machine learning classifier.

6. The system of claim 5, wherein the statistical machine learning classifier is to execute a Winnow analysis with respect to the electronic document.

7. The system of claim 1, wherein the text classifier comprises a rules-based classifier and is to analyze the polar expression using a shallow natural language processing technique.

8. A method comprising:
processing text in electronic content to identify a topical expression and a polar expression in the electronic content;
determining a topic of the topical expression and a polarity of the polar expression;
identifying a relevance of the polar expression to the topical expression;
generating a confidence score associated with the relevance of the polar expression to the topical expression; and
displaying the topical expression with the polar expression and the confidence score to a user.

9. The method of claim 8, further comprising displaying an aggregated plurality of topical expressions and corresponding polar expressions identified within the electronic content.

10. The method of claim 8, further comprising displaying an aggregated plurality of topical expression and corresponding polar expressions identified from a plurality of electronic content.

11. The method of claim 8, wherein processing text further comprises performing a natural language processing analysis of the electronic content to identify the topical expression and the polar expression, and wherein identifying further comprises performing a natural language processing analysis of the topical expression and the polar expression to identify a relevance of the polar expression to the topical expression.

12. The method of claim 8, wherein identifying further comprises applying a statistical machine learning classification to identify a relevance of the polar expression to the topical expression.

13. The method of claim 8, wherein the identifying further comprises applying a rules-based classification with a shallow natural language processing technique to analyze the polar expression.

14. A tangible computer readable storage medium including executable program instructions which, when executed by a computer processor, cause the computer to implement a system comprising:
a text mining tool to process text in an electronic document to identify a topical expression and a polar expression in the electronic document;
a text classifier to determine a topic of the topical expression and a polarity of the polar expression, to identify a relevance of the polar expression to the topical expression; and
a user interface to display the topical expression with the polar expression to a user.

15. The computer readable storage medium of claim 14, wherein the text classifier is to generate a confidence score associated with the relevance of the polar expression to the topical expression.

16. The computer readable storage medium of claim 14, wherein the user interface is to display an aggregated plurality of topical expression and corresponding polar expressions identified from a plurality of electronic documents.

17. The computer readable storage medium of claim 14, wherein the text mining tool is to perform a natural language processing analysis of the electronic document to identify a topical expression and a polar expression and the text classifier is to perform a natural language processing analysis of the topical expression and the polar expression to identify a relevance of the polar expression to the topical expression, and to generate a confidence score associated with the relevance of the polar expression to the topical expression.

18. The computer readable storage medium of claim 14, wherein the text classifier comprises a rules-based classifier to apply a statistical generator model to analyze the polar expression in relation to the topical expression.

* * * * *